(12) United States Patent
Smith

(10) Patent No.: US 12,305,958 B2
(45) Date of Patent: May 20, 2025

(54) ILLUMINATED SIGHTING SYSTEM

(71) Applicant: HiViz, LLC, Laramie, WY (US)

(72) Inventor: Bradley R. Smith, Timnath, CO (US)

(73) Assignee: HiViz, LLC, Laramie, WY (US)

( * ) Notice: Subject to any disclaimer, the term of this patent is extended or adjusted under 35 U.S.C. 154(b) by 0 days.

(21) Appl. No.: 18/214,251

(22) Filed: Jun. 26, 2023

(65) Prior Publication Data

US 2024/0011739 A1    Jan. 11, 2024

Related U.S. Application Data

(63) Continuation-in-part of application No. 17/845,529, filed on Jun. 21, 2022, now Pat. No. 12,007,201.

(51) Int. Cl.
*F41G 1/38* (2006.01)
*F41G 1/34* (2006.01)
*G02B 23/16* (2006.01)

(52) U.S. Cl.
CPC .............. *F41G 1/38* (2013.01); *F41G 1/345* (2013.01); *G02B 23/16* (2013.01)

(58) Field of Classification Search
CPC ... F41G 1/027; F41G 1/14; F41G 1/30; F41G 1/32; F41G 1/34; F41G 1/345; F41G 1/38; F41G 3/005; G02B 23/16
USPC .................................................... 42/119, 132
See application file for complete search history.

(56) References Cited

U.S. PATENT DOCUMENTS

| | | | |
|---|---|---|---|
| 815,090 | A | 3/1906 | Hukill |
| 898,531 | A | 9/1908 | Tufts |
| 1,292,211 | A | 1/1919 | Young |
| 1,346,303 | A | 7/1920 | Trevor et al. |
| 1,363,553 | A | 12/1920 | Barringer |
| 1,818,381 | A | 8/1931 | Caruth |
| 2,706,335 | A | 4/1955 | Munsey |
| 2,970,380 | A | 2/1961 | Hill |

(Continued)

FOREIGN PATENT DOCUMENTS

| | | |
|---|---|---|
| AT | 507403 | 4/2010 |
| CH | 667150 | 9/1988 |

(Continued)

OTHER PUBLICATIONS

U.S. Appl. No. 61/459,749, filed Dec. 17, 2010.

(Continued)

*Primary Examiner* — Joshua E Freeman
*Assistant Examiner* — Benjamin S Gomberg
(74) *Attorney, Agent, or Firm* — Craig R. Miles; CR MILES P.C.

(57) ABSTRACT

An illuminated sighting system for a firearm sight, including a first light conductive member having a first light conductive member viewing end that emits a first amount of emitted light which provides a first viewable aiming indicium that indicates alignment of a firearm with a target; a second light conductive member viewing end that emits a second amount of emitted light which provides a second viewable aiming indicium that indicates misalignment of the firearm with the target; wherein the second light conductive member viewing end disposes about the first light conductive member viewing end; and a lens operably coupled to the first and second light conductive member viewing ends.

25 Claims, 15 Drawing Sheets

(56) References Cited

U.S. PATENT DOCUMENTS

| | | | |
|---|---|---|---|
| 3,098,303 A * | 7/1963 | Plisk | F41G 1/32 |
| | | | 42/145 |
| 3,121,163 A | 2/1964 | Rickert | |
| 3,192,632 A | 7/1965 | Von Stavenhagen | |
| 3,362,074 A | 1/1968 | Luebkeman et al. | |
| 3,641,676 A | 2/1972 | Knutsen et al. | |
| 3,645,635 A | 2/1972 | Steck | |
| 3,678,590 A * | 7/1972 | Hayward | F41G 1/345 |
| | | | 42/114 |
| 3,698,092 A | 10/1972 | Rosenhan | |
| 3,700,339 A * | 10/1972 | Steck, III | F41G 1/30 |
| | | | 42/145 |
| 3,813,790 A | 6/1974 | Kaltmann | |
| 3,886,667 A | 6/1975 | Rueb | |
| 3,905,708 A | 9/1975 | Steck, III | |
| 3,949,482 A | 4/1976 | Ross | |
| 4,070,763 A * | 1/1978 | Carts, Jr. | G02B 6/06 |
| | | | 385/115 |
| 4,136,963 A * | 1/1979 | Budden | G02B 27/34 |
| | | | 42/113 |
| 4,495,705 A | 1/1985 | Kowalski et al. | |
| 4,536,965 A | 8/1985 | Tildeblad | |
| 4,574,335 A | 3/1986 | Frimer | |
| 4,745,686 A | 5/1988 | Willis | |
| 4,745,698 A | 5/1988 | Schwulst | |
| 4,806,007 A | 2/1989 | Bindon | |
| 4,877,324 A | 10/1989 | Hauri et al. | |
| 5,065,519 A | 11/1991 | Bindon | |
| 5,279,061 A | 1/1994 | Betz et al. | |
| 5,359,800 A | 11/1994 | Fisher | |
| 5,440,458 A | 8/1995 | Volk | |
| 5,500,911 A | 3/1996 | Roff | |
| 5,548,493 A | 8/1996 | Young | |
| 5,560,113 A | 10/1996 | Simo et al. | |
| 5,638,604 A | 6/1997 | Lorocco | |
| 5,735,070 A | 4/1998 | Vasquez et al. | |
| 5,752,761 A | 5/1998 | Pietruczynik et al. | |
| 5,822,872 A | 10/1998 | Waki | |
| 5,850,700 A | 12/1998 | Capson et al. | |
| 5,862,618 A * | 1/1999 | Brown | F41G 1/345 |
| | | | 42/145 |
| 5,878,503 A | 3/1999 | Howe et al. | |
| 5,926,963 A | 7/1999 | Knight | |
| 5,930,906 A | 8/1999 | Howe et al. | |
| 5,956,854 A | 9/1999 | Lorocco | |
| 6,005,024 A | 12/1999 | Anders et al. | |
| 6,014,830 A | 1/2000 | Brown et al. | |
| 6,035,539 A | 3/2000 | Hollenbach et al. | |
| 6,058,615 A | 5/2000 | Uhlmann et al. | |
| 6,058,616 A | 5/2000 | Bubits | |
| 6,122,833 A | 9/2000 | Lorocco | |
| 6,216,351 B1 | 4/2001 | Flubacher et al. | |
| 6,216,352 B1 | 4/2001 | Lorocco | |
| 6,233,836 B1 | 5/2001 | Uhlmann | |
| 6,245,433 B1 | 6/2001 | Nakamura et al. | |
| 6,345,470 B1 | 2/2002 | Slaght et al. | |
| 6,358,855 B1 | 3/2002 | Ramachandran et al. | |
| 6,360,471 B1 | 3/2002 | Stein | |
| 6,360,472 B1 | 3/2002 | Lorocco | |
| 6,375,864 B1 | 4/2002 | Phillips et al. | |
| 6,385,855 B1 | 5/2002 | Tymianski | |
| 6,421,946 B1 | 7/2002 | LoRocco | |
| 6,446,377 B1 | 9/2002 | Hollenbah et al. | |
| 6,571,482 B1 | 6/2003 | Tymianski | |
| 6,596,074 B2 | 7/2003 | Pomeroy | |
| 6,604,315 B1 | 8/2003 | Smith et al. | |
| 6,678,987 B2 | 1/2004 | Howe | |
| 6,684,551 B2 | 2/2004 | Howe | |
| 7,238,301 B2 | 7/2007 | Huang et al. | |
| 7,338,877 B1 | 3/2008 | Meyer et al. | |
| 7,451,566 B1 | 11/2008 | Price | |
| 7,562,486 B2 | 7/2009 | LoRocco | |
| 7,627,976 B1 | 12/2009 | Olson | |
| 7,908,783 B2 | 3/2011 | Howe et al. | |
| 8,245,433 B1 | 8/2012 | Smith | |
| D679,359 S | 4/2013 | Adock, Jr. | |
| 8,425,063 B2 | 4/2013 | Buckingham et al. | |
| 8,438,775 B2 | 5/2013 | Howe et al. | |
| 8,579,450 B2 * | 11/2013 | Profos | G02B 27/34 |
| | | | 42/145 |
| 8,635,800 B2 | 1/2014 | Glimpse et al. | |
| 8,635,801 B2 | 1/2014 | Glimpse et al. | |
| D700,268 S | 2/2014 | Hormberg | |
| 8,925,237 B2 | 1/2015 | Howe et al. | |
| 8,997,393 B2 | 4/2015 | Bar Yona | |
| 9,869,525 B1 | 1/2018 | Howe et al. | |
| 10,088,274 B2 | 10/2018 | Howe et al. | |
| 10,180,306 B2 | 1/2019 | Ben Zion et al. | |
| 10,578,401 B2 | 3/2020 | Ben Zion et al. | |
| 10,753,707 B2 | 8/2020 | Howe et al. | |
| 10,760,877 B2 | 9/2020 | Howe et al. | |
| 10,837,737 B1 | 11/2020 | Wright | |
| 11,268,787 B1 | 3/2022 | Bernkrant et al. | |
| 12,007,201 B2 | 6/2024 | Howe et al. | |
| 2006/0123687 A1 | 6/2006 | Howe et al. | |
| 2007/0107292 A1 * | 5/2007 | Bar-Yona | F41G 1/30 |
| | | | 42/144 |
| 2008/0184609 A1 * | 8/2008 | Schulst | F41G 1/42 |
| | | | 42/111 |
| 2009/0013581 A1 | 1/2009 | LoRocco | |
| 2010/0064581 A1 | 3/2010 | Johnson | |
| 2011/0107650 A1 | 5/2011 | Howe et al. | |
| 2011/0314721 A1 | 12/2011 | Lamb | |
| 2012/0151817 A1 | 6/2012 | Howe et al. | |
| 2012/0186129 A1 | 7/2012 | Sne et al. | |
| 2012/0198750 A1 | 8/2012 | Mansfield | |
| 2013/0255129 A1 | 10/2013 | Curry | |
| 2014/0096430 A1 | 4/2014 | Kruse | |
| 2015/0153136 A1 | 6/2015 | Howe et al. | |
| 2018/0045487 A1 * | 2/2018 | Abo | F41G 1/345 |
| 2018/0053575 A1 | 2/2018 | Karchon et al. | |
| 2018/0231350 A1 * | 8/2018 | Howe | F41G 1/14 |
| 2021/0108886 A1 | 4/2021 | Howe et al. | |
| 2022/0113116 A1 * | 4/2022 | Rohrer | F41G 1/01 |

FOREIGN PATENT DOCUMENTS

| | | |
|---|---|---|
| EP | 0254675 | 1/1988 |
| EP | 3660442 B1 | 9/2021 |
| GB | 1532090 | 11/1978 |
| WO | WO 2006/111813 | 10/2006 |
| WO | WO2010/034458 | 4/2010 |
| WO | WO2011/067291 | 6/2011 |
| WO | WO 2019/209535 | 10/2019 |

OTHER PUBLICATIONS

U.S. Appl. No. 16/147,307, Office Action mailed Sep. 17, 2019.
Aro-Tek Ltd. Tri-Lite Day/Night Sight, Catalog, 1997, 3 total pages.
MB-Microtec. Tactical Lynx, on-line catalog, www.mbmicrotec.com, originally downloaded May 31, 2011, 3 total pages.
Personal Defense World. Truglo Introduces The new Brite-Site TFX Handgun Sight. Website, http://www.personaldefenseworld.com, originally downloaded Apr. 22, 2015, 5 pages total.
Truglo. TFX™ Tritium/Fiber-Optic Day/Night Sights. Website, http://www.truglo.com, originally downloaded Mar. 20, 2015, 1 page.
PCT International Patent Application No. PCT/US23/25821, International Search Report and Written Opinion of the International Searching Authority dated Apr. 3, 2024, 12 pages.
PCT International Patent Application No. PCT/US19/26809, International Search Report and Written Opinion of the International Searching Authority dated Oct. 3, 2019, 17 pages.
optics planet.com. Sig Sauer X-Ray1 Enhanced Day Sight Set, No. 6. Website, https://www.opticsplanet.com/sig-sauer-x-ray1-enhanced-day-sight-set.html, originally downloaded Jun. 29, 2022, 3 pages.
Meprolight. This backup plan is always in sight. Overview. Website, https://www.meprolight.com/product-ft-bullseye/, originally downloaded Nov. 16, 2021, 2 pages.

(56) References Cited

OTHER PUBLICATIONS

Truglo. Fat•Bead™. Website, https://www.truglo.com/fat-bead/, originally downloaded Jul. 19, 2023, 4 pages.
Truglo. Tru•Bead™ universal shotgun sights. Website, https://www.truglo.com/tru-bead-universal-shotgun-sights/, originally downloaded Jul. 19, 2023, 4 pages.

* cited by examiner

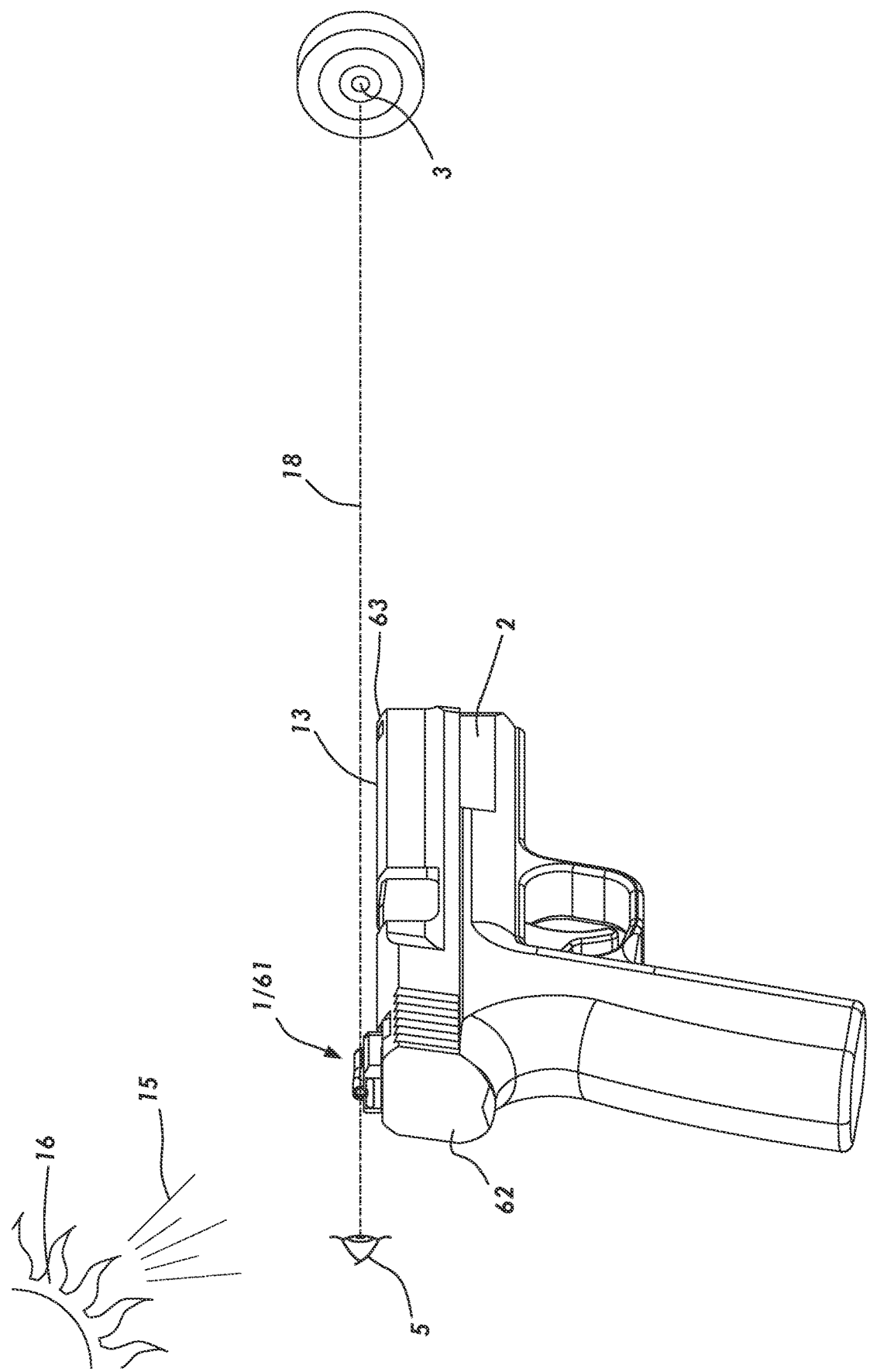

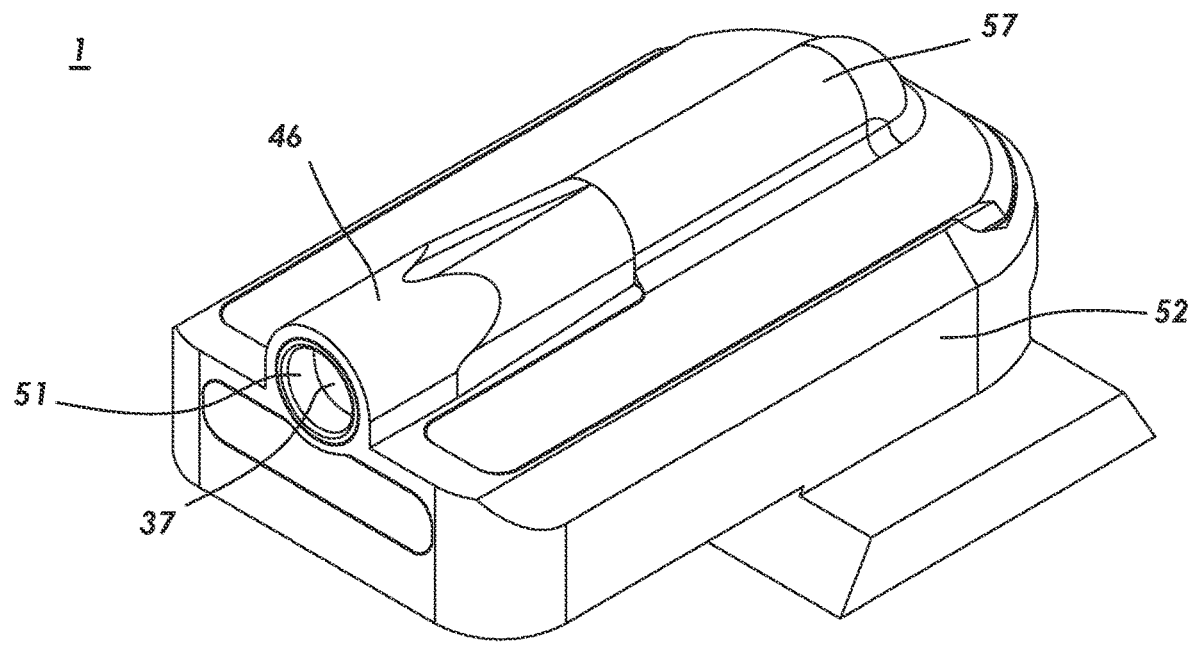
FIG. 2A
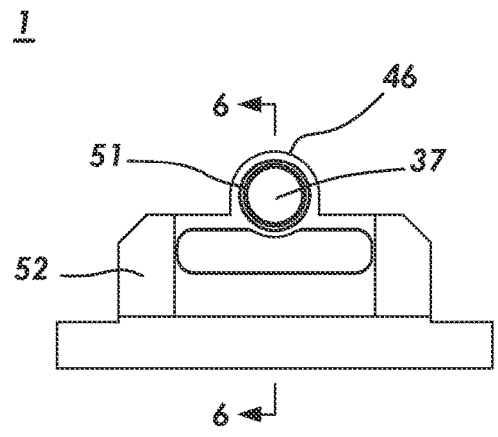 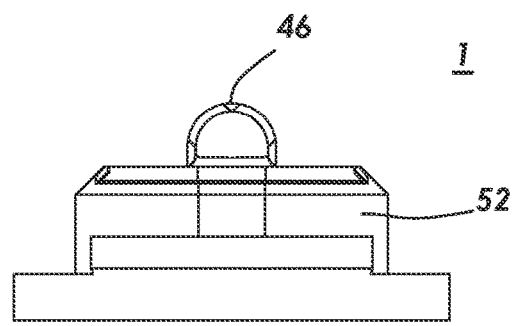
FIG. 2B  FIG. 2C

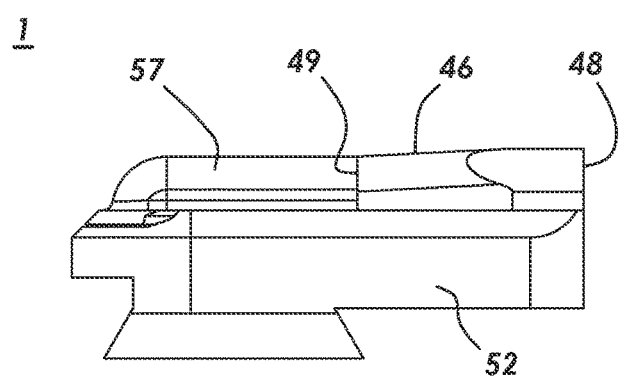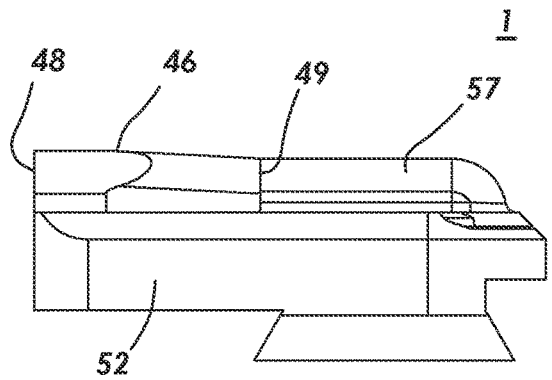
FIG. 2D  FIG. 2E
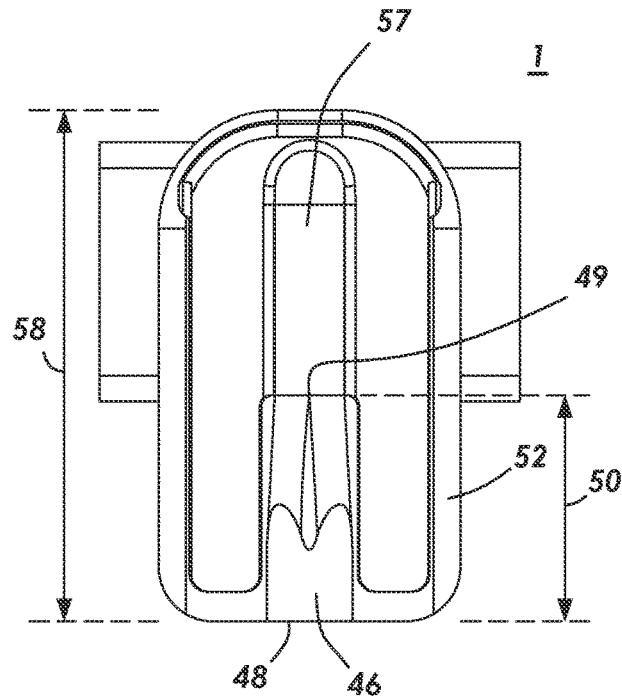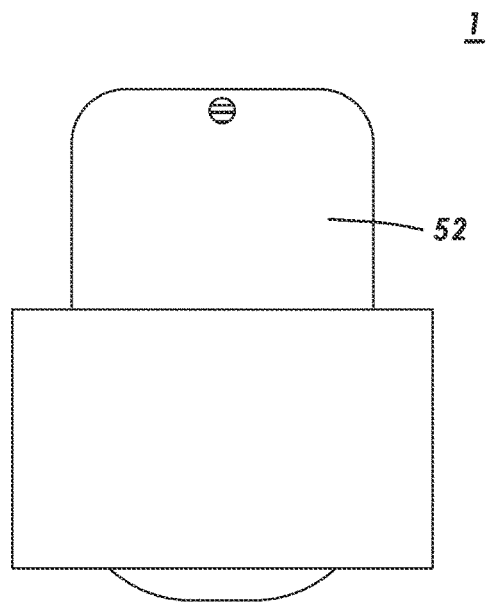
FIG. 2F  FIG. 2G

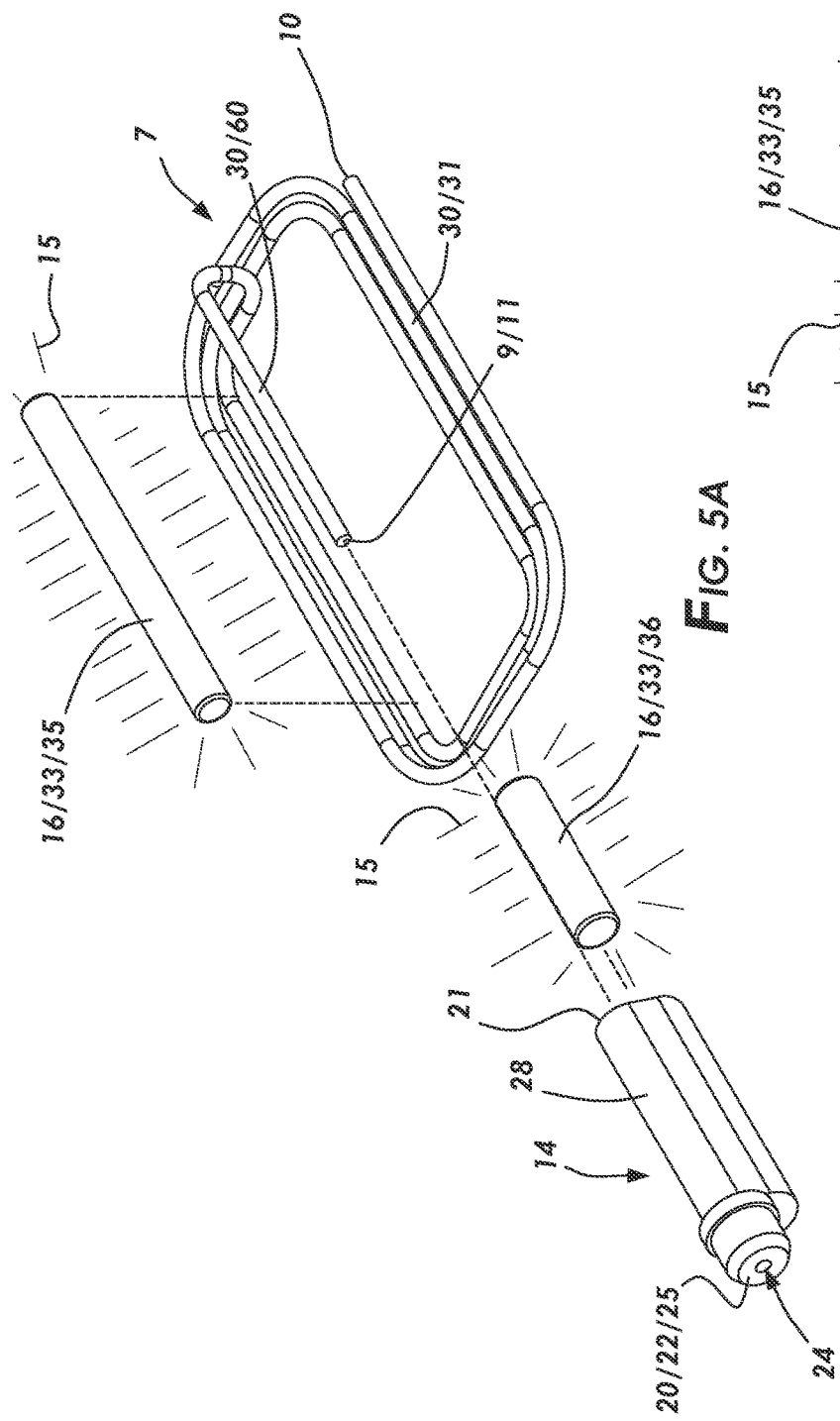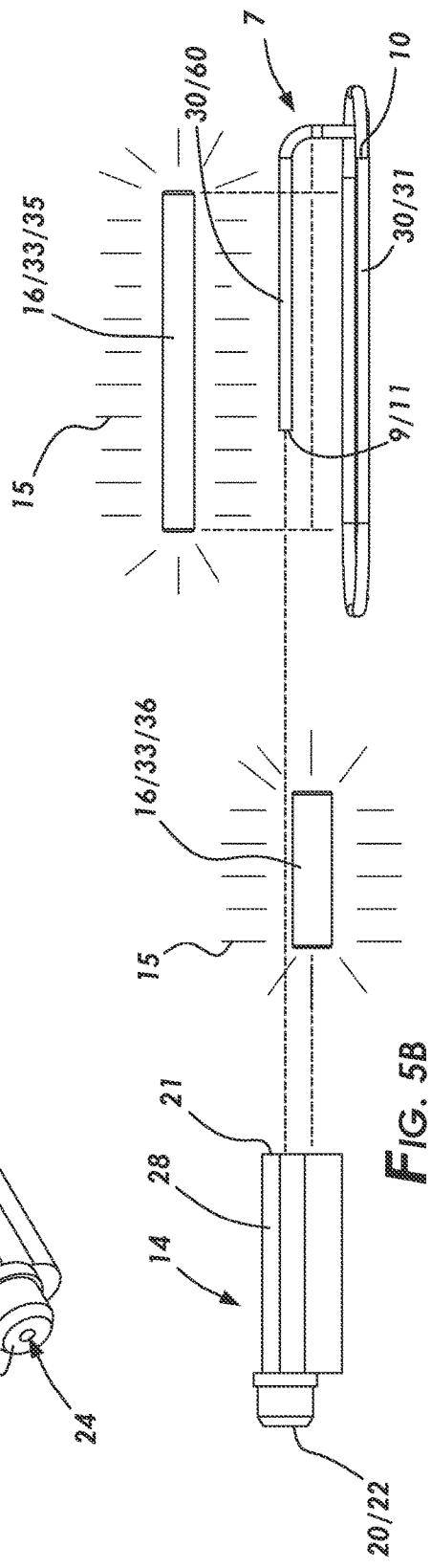
FIG. 5A
FIG. 5B

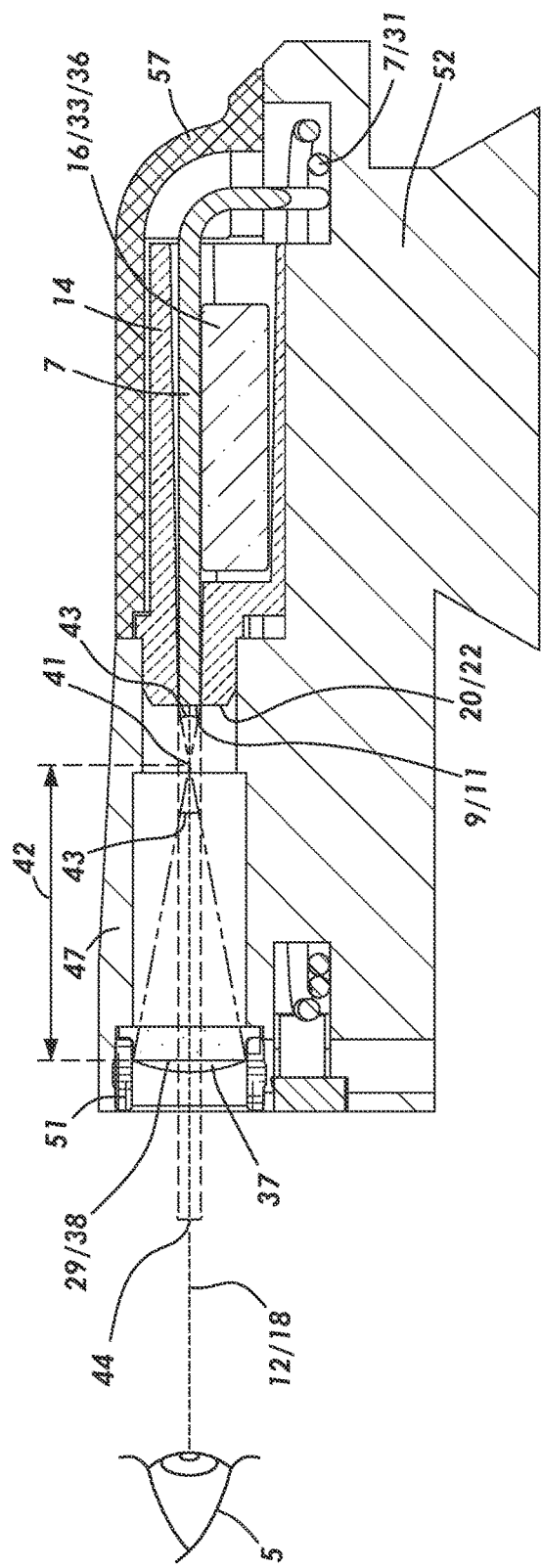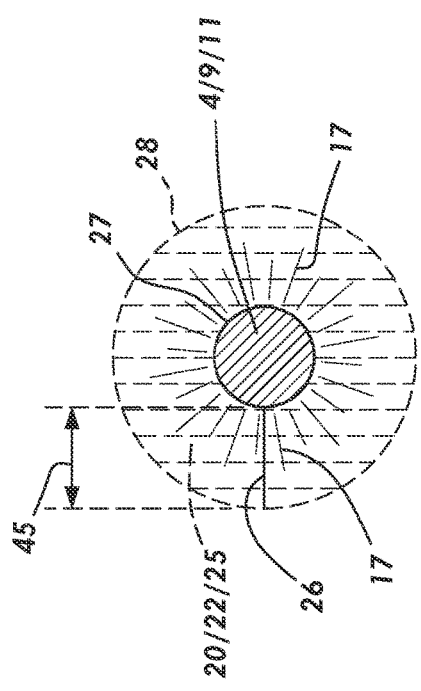
FIG. 7A
FIG. 7B

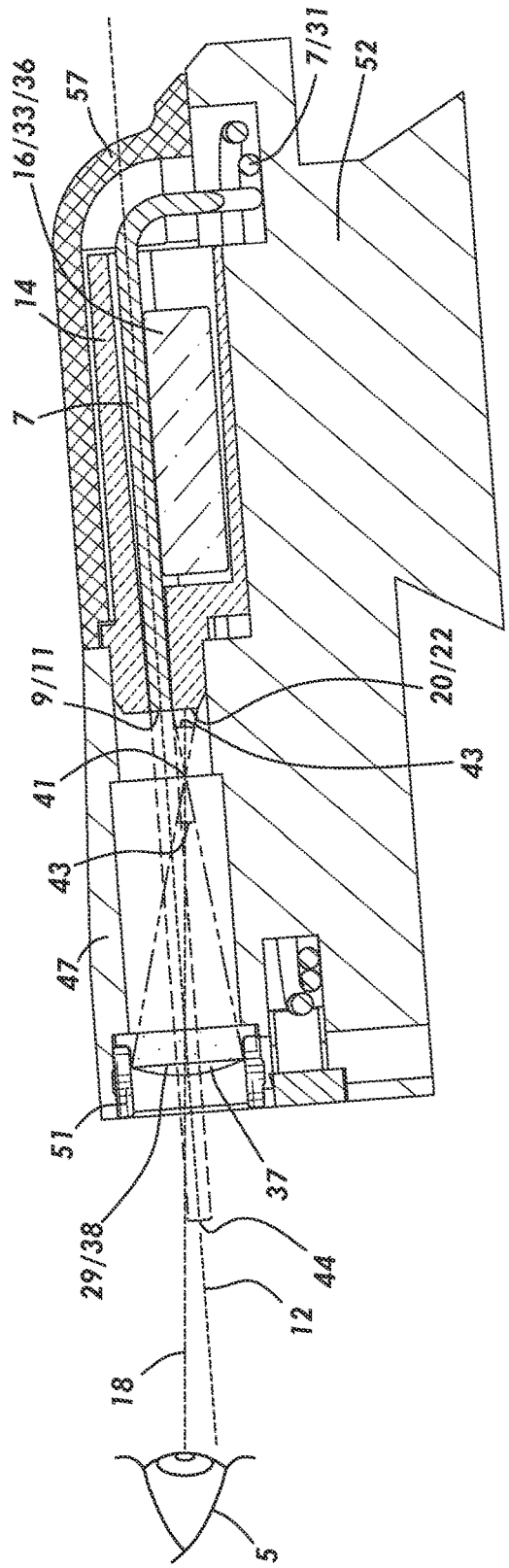
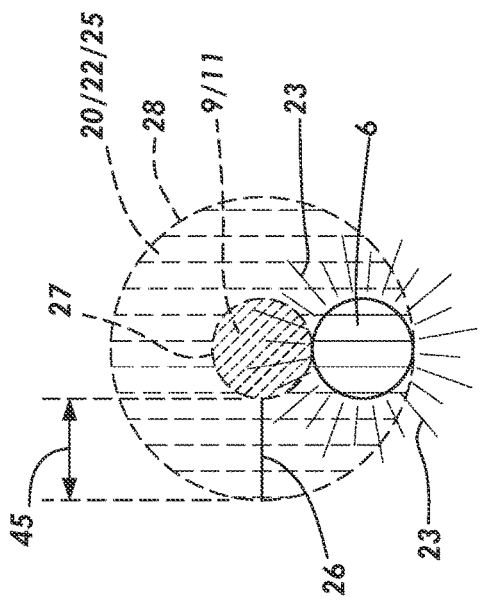
FIG. 7C
FIG. 7D

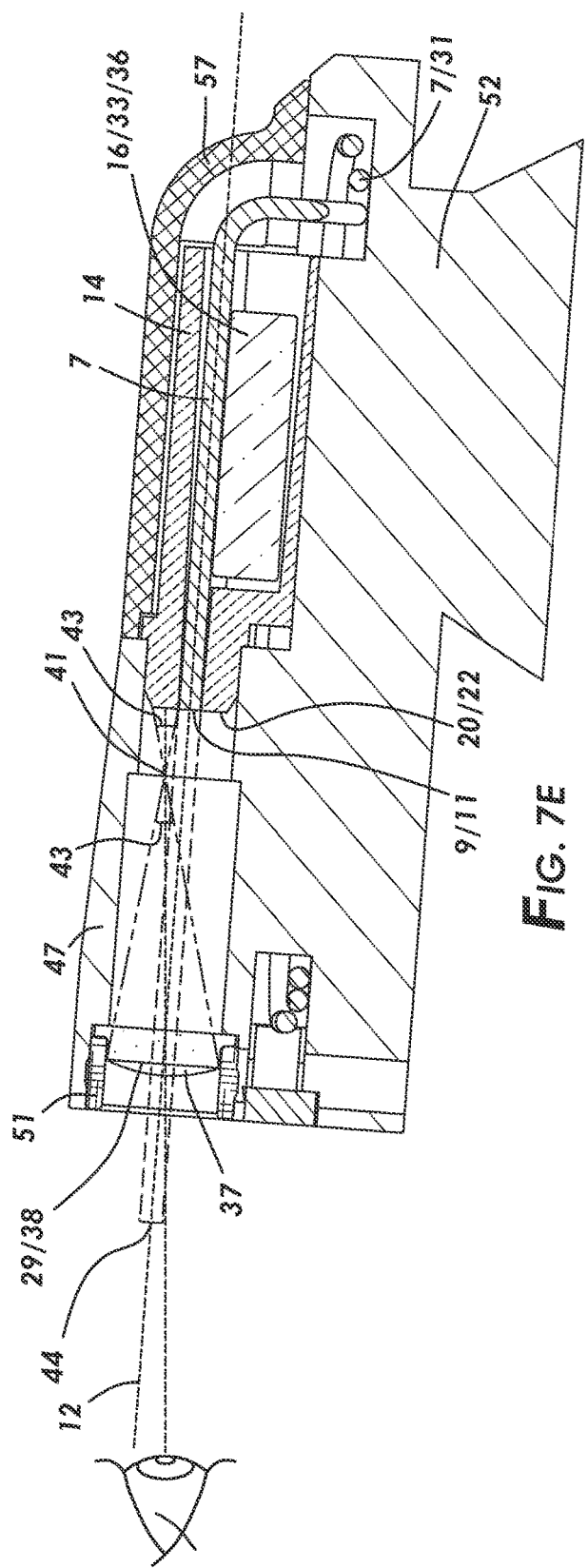
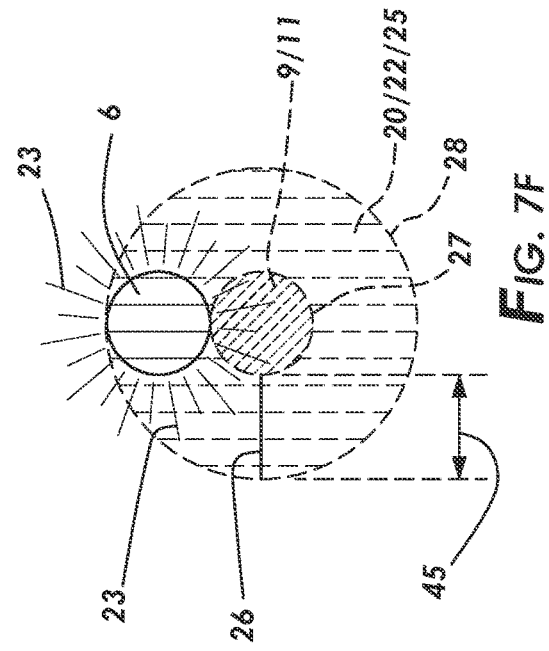
FIG. 7E
FIG. 7F

ILLUMINATED SIGHTING SYSTEM

This United States Patent Application is a continuation-in-part of U.S. patent application Ser. No. 17/845,529, filed Jun. 21, 2022.

I. SUMMARY OF THE INVENTION

Disclosed herein is an illuminated sighting system for a firearm, including a first light conductive member having a first light conductive member viewing end, whereby the first light conductive member can be configured to (i) receive light from one or more light sources, and (ii) transmit at least a portion of the light internally toward the first light conductive member viewing end for emission as a first amount of emitted light which provides a first viewable aiming indicium that indicates alignment of the firearm with a target; a second light conductive member having a second light conductive member viewing end, whereby the second light conductive member can be configured to (i) receive light from one or more light sources, and (ii) transmit at least a portion of the light internally toward the second light conductive member viewing end for emission as a second amount of emitted light which provides a second viewable aiming indicium that indicates misalignment of the firearm with the target. Notably, the second light conductive member viewing end disposes about the first light conductive member viewing end. The illuminated sighting system further includes a lens operably coupled to the first and second light conductive member viewing ends.

II. A BRIEF DESCRIPTION OF THE DRAWINGS

FIG. 1A is an illustration of a method of using a particular embodiment of the inventive illuminated sighting system as a rear sight for a firearm.

FIG. 2A is a perspective view of a particular embodiment of the inventive illuminated sighting system.

FIG. 2B is a front view of the particular embodiment of the illuminated sighting system shown in FIG. 2A.

FIG. 2C is a rear view of the particular embodiment of the illuminated sighting system shown in FIG. 2A.

FIG. 2D is a first side view of the particular embodiment of the illuminated sighting system shown in FIG. 2A.

FIG. 2E is a second side view of the particular embodiment of the illuminated sighting system shown in FIG. 2A.

FIG. 2F is a top view of the particular embodiment of the illuminated sighting system shown in FIG. 2A.

FIG. 2G is a bottom view of the particular embodiment of the illuminated sighting system shown in FIG. 2A.

FIG. 5A is an exploded perspective view of a particular embodiment of first and second light conductive members and corresponding first and second light emitting elements of the inventive illuminated sighting system.

FIG. 5B is an exploded side view of the particular embodiment of the first and second light conductive members and corresponding first and second light emitting elements shown in FIG. 5A.

FIG. 7A is a cross-sectional view of the particular embodiment of the illuminated sighting system shown in FIG. 2B, whereby the sight axis of the illuminated sighting system is aligned with the line of sight of an aiming eye.

FIG. 7B is a front view of the first viewable aiming indicium which is visible to the aiming eye when the sight axis of the illuminated sighting system is aligned with the line of sight of the aiming eye as shown in FIG. 7A.

FIG. 7C is a cross-sectional view of the particular embodiment of the illuminated sighting system shown in FIG. 2B, whereby the sight axis of the illuminated sighting system is misaligned with the line of sight of an aiming eye.

FIG. 7D is a front view of the second viewable aiming indicium which is visible to the aiming eye when the sight axis of the illuminated sighting system is misaligned with the line of sight of the aiming eye as shown in FIG. 7C.

FIG. 7E is a cross-sectional view of the particular embodiment of the illuminated sighting system shown in FIG. 2B, whereby the sight axis of the illuminated sighting system is misaligned with the line of sight of an aiming eye.

FIG. 7F is a front view of the second viewable aiming indicium which is visible to the aiming eye when the sight axis of the illuminated sighting system is misaligned with the line of sight of the aiming eye as shown in FIG. 7E.

III. DETAILED DESCRIPTION OF THE PREFERRED EMBODIMENTS

Figure 1B:
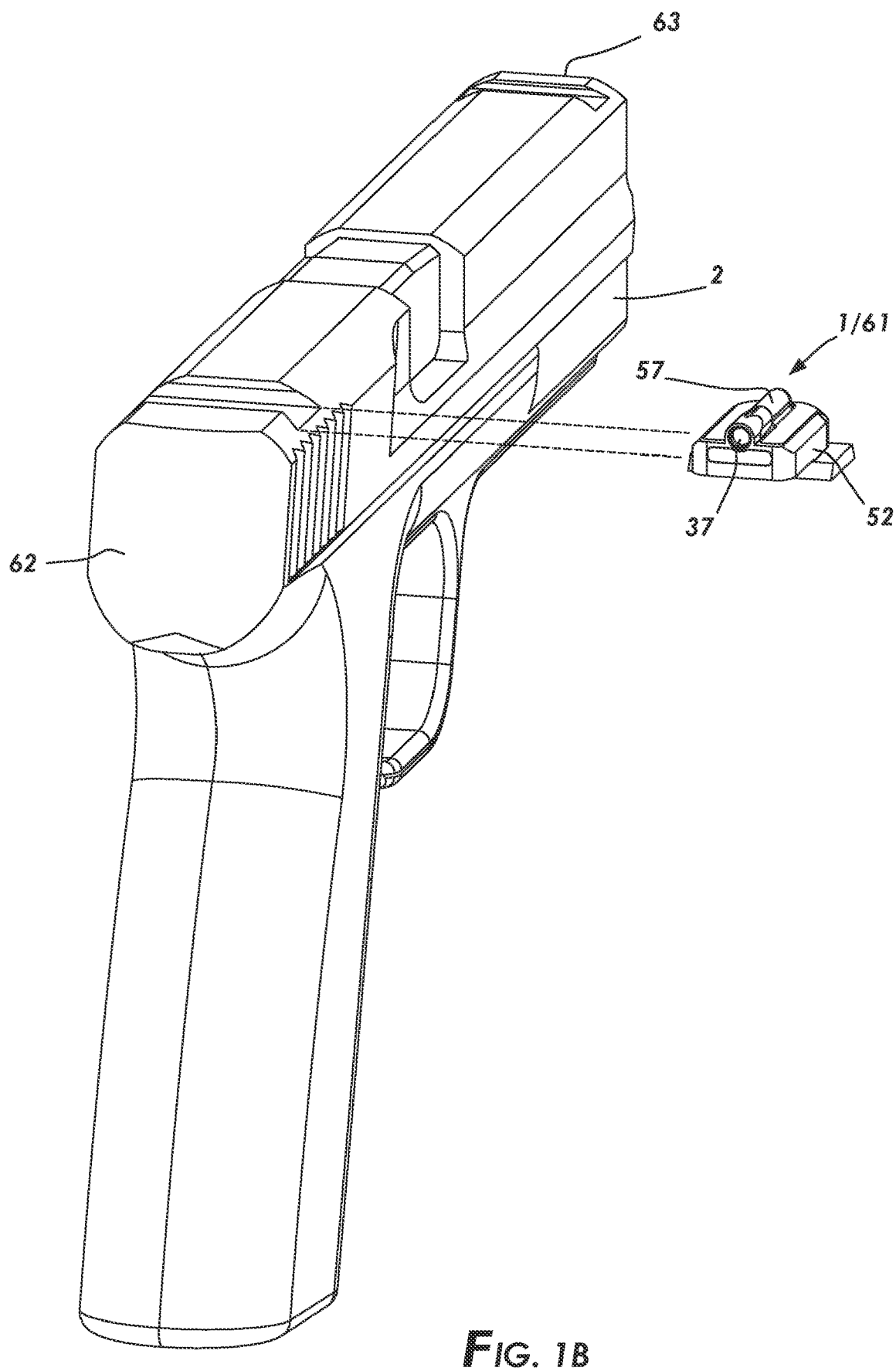
FIG. 1B is a perspective view of the particular embodiment of the illuminated sighting system shown in FIG. 1A exploded from the firearm.
Figure 3A:
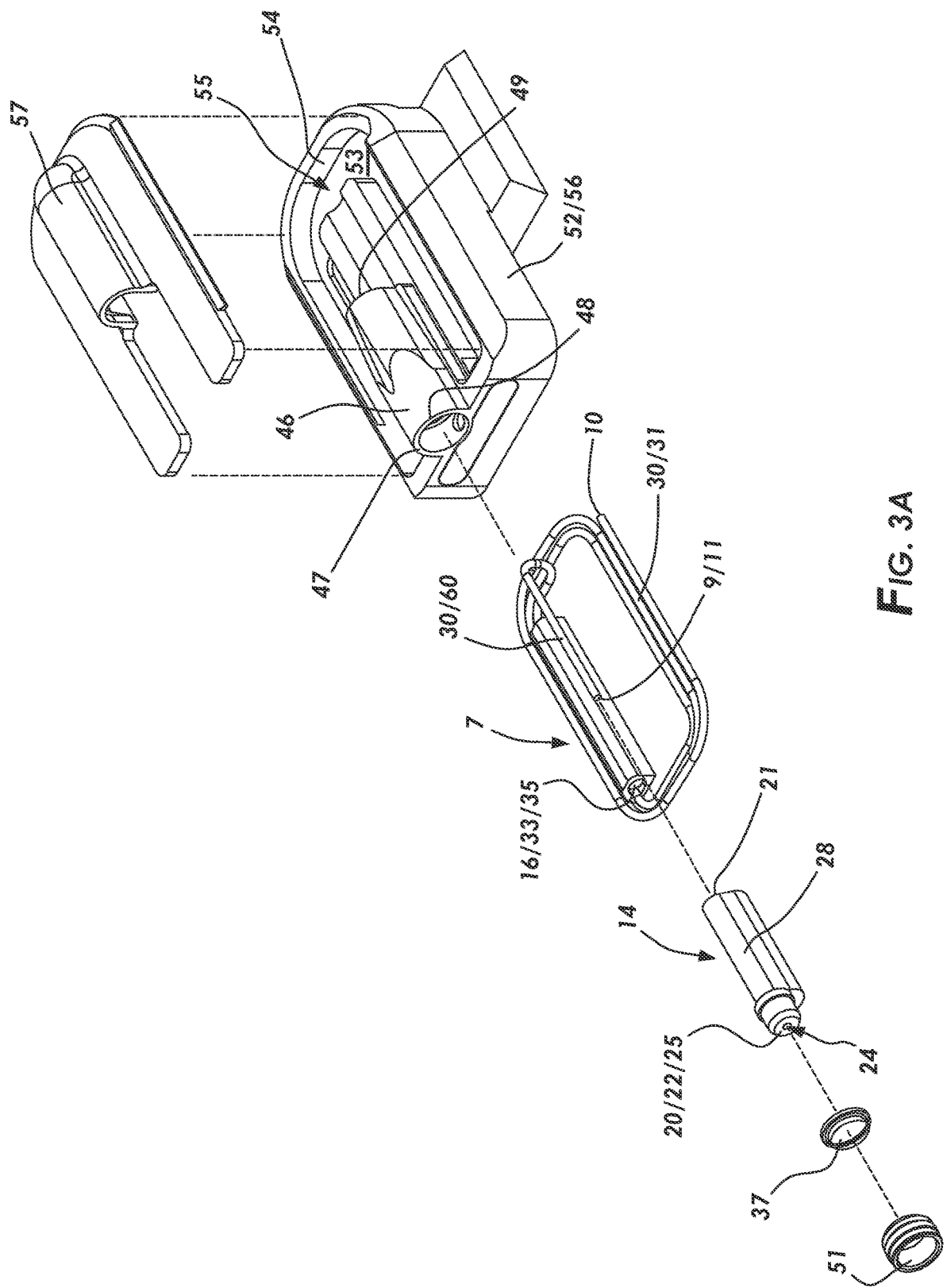
FIG. 3A is an exploded perspective view of a particular embodiment of the inventive illuminated sighting system.
Figure 3B:
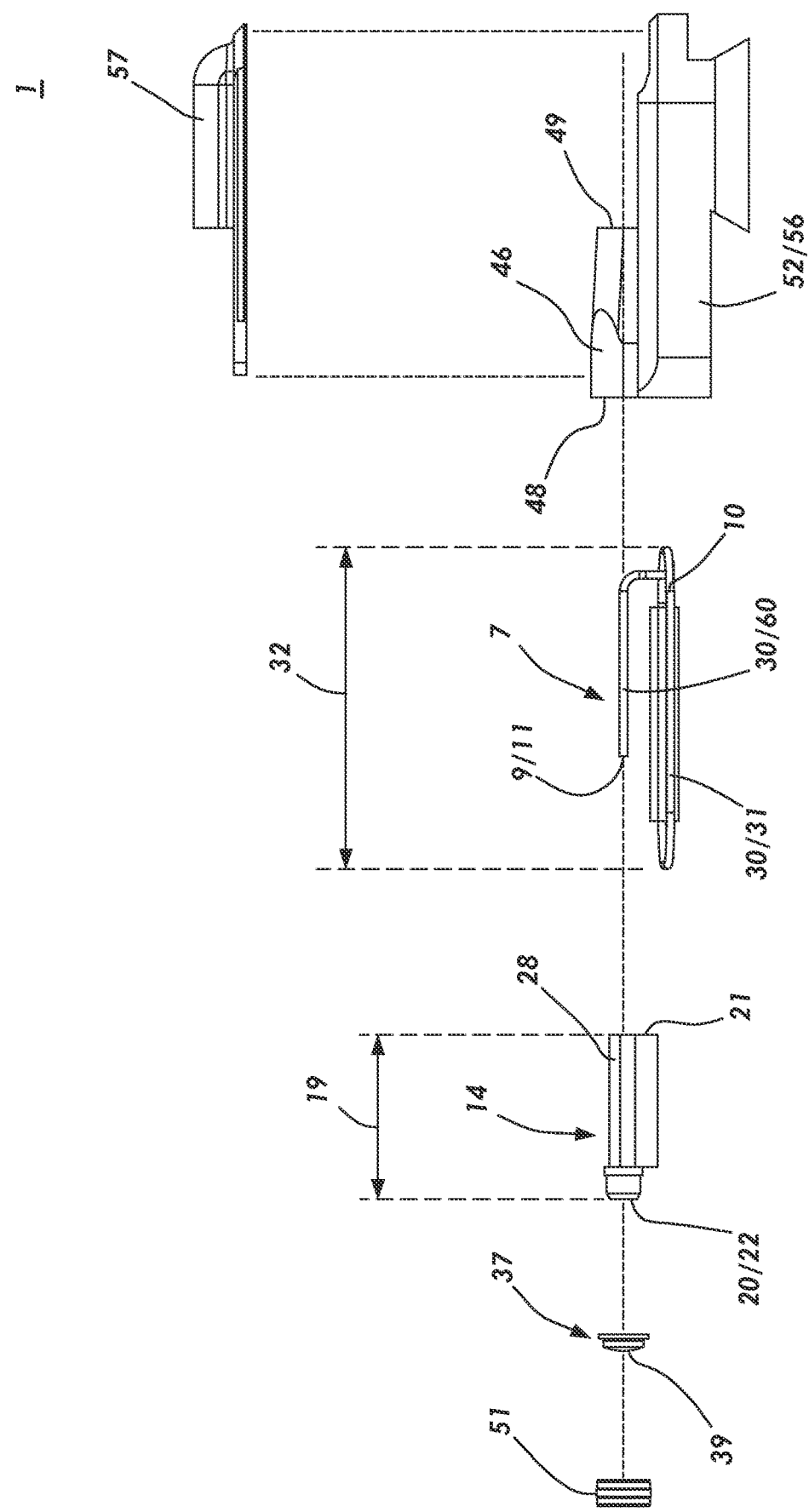
FIG. 3B is an exploded side view of the particular embodiment of the illuminated sighting system shown in FIG. 3A.

Now referring primarily to FIG. 1A, which illustrates a method of using a particular embodiment of the inventive illuminated sighting system (1) for use with a weapon, such as a firearm (2), to aid in aiming the firearm (2) in both bright light and low light conditions, whereby the illuminated sighting system (1) may be particularly useful for rapid target acquisition. When the firearm (2) is optimally aligned with a target (3), a first viewable aiming indicium (4) can be seen by the aiming eye (5) of the shooter (as shown in FIGS.

7A and 7B). Conversely, when there is a deviation from the optimal alignment, a second viewable aiming indicium (6) which differs from the first viewable aiming indicium (4) can be seen by the aiming eye (5) of the shooter (as shown in FIGS. 7C through 7F); thus, the second viewable aiming indicium (6) may provide a visual warning to the shooter that the firearm (2) is not optimally aligned with the target (3).

Typically, when aligning the firearm (2) with the target (3), substantially only one or the other of the first and second viewable aiming indicia (4)(6) can be visible to the aiming eye (5) of the shooter at any one time, depending of course upon the alignment or misalignment of the firearm (2) with the target (3).

While the present illuminated sighting system (1) may be described herein for use with a firearm (2), it will be understood that the illuminated sighting system (1) can be used with a numerous and wide variety of weapons for the aiming thereof, and is of course not limited to just firearms (2).

Now referring primarily to FIGS. 2A through 6, the illuminated sighting system (1) includes an elongate first light conductive member (7) having a first light conductive member length (8) disposed between opposing first light conductive member first and second ends (9)(10), whereby the first light conductive member first end (9) provides a first light conductive member viewing end (11) which can be viewed by the shooter. A sight axis (12) of the illuminated sighting system (1) can pass axially through the center of the first light conductive member viewing end (11) (as shown in FIGS. 6, 7A, 7C, and 7E), whereby the sight axis (12) can be substantially parallel to the barrel (13) of the firearm (2).

The term "axial" and derivatives thereof as used herein means in a direction generally parallel or parallel to a longitudinal axis, such as a longitudinal axis of the first light conductive member (7), the second light conductive member (14), the illuminated sighting system (1), the firearm (2), etc.

The first light conductive member (7) can be configured to (i) receive light (15) incident thereupon from one or more light sources (16), and (ii) transmit at least a portion of the light (15) internally toward the first light conductive member viewing end (11) for emission as a first amount of emitted light (17) which provides a first viewable aiming indicium (4) that indicates alignment of the firearm (2) with the target (3); when aligned, the first viewable aiming indicium (4) can be within a shooter's line of sight (18) which extends from their aiming eye (5) along a straight path to the target (3) (as shown in FIG. 1A), thus making the first viewable aiming indicium (4) visible to the shooter (as shown in FIGS. 7A and 7B). Further, when the firearm (2) is aligned with the target (3), the sight axis (12) of the illuminated sighting system (1) can be parallel to and coincident with the shooter's line of sight (18) or, said another way, the sight axis (12) can dispose at an angle of about 0° relative to the shooter's line of sight (18).

As to particular embodiments, the first light conductive member (7) may be the same as or similar to the elongate light collector disclosed in U.S. patent application Ser. No. 17/845,529, which is incorporated by reference in its entirety herein.

Again referring primarily to FIGS. 2A through 6, the illuminated sighting system (1) further includes an elongate second light conductive member (14) having a second light conductive member length (19) disposed between opposing second light conductive member first and second ends (20)(21), whereby the second light conductive member first end (20) provides a second light conductive member viewing end (22) which can be viewed by the shooter.

The second light conductive member (14) can be configured to (i) receive light (15) incident thereupon from one or more light sources (16), and (ii) transmit at least a portion of the light (15) internally toward the second light conductive member viewing end (22) for emission as a second amount of emitted light (23) which provides a second viewable aiming indicium (6) that indicates misalignment of the firearm (2) with the target (3); when misaligned, the first viewable aiming indicium (4) can fall outside of the shooter's line of sight (18) and correspondingly, the first viewable aiming indicium (4) is not visible to the shooter. However, when the firearm (2) is misaligned with the target (3), the second viewable aiming indicium (6) may be within the shooter's line of sight (18), thus making the second viewable aiming indicium (6) visible to the shooter (as shown in FIGS. 7C through 7F). Consequently, the shooter may reposition the firearm (2) (and correspondingly the sight axis (12)) until the first viewable aiming indicium (4) appears within the shooter's line of sight (18), indicating that said repositioning resulted in alignment of the firearm (2) with the target (3).

Of course, in use, the first and second light conductive member viewing ends (11)(22) can be oriented toward the shooter such that the first and second viewable aiming indicia (4)(6) can be seen by their aiming eye (5).

Figure 4A:
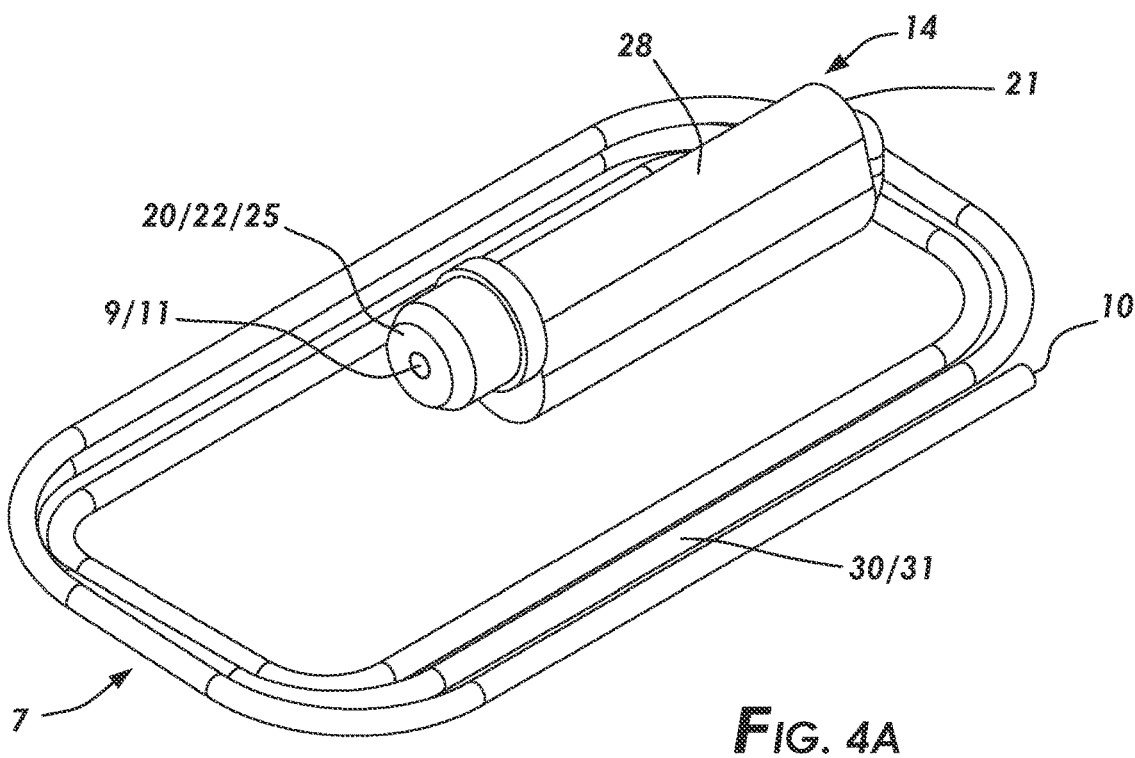
FIG. 4A is a perspective view of a particular embodiment of first and second light conductive members of the inventive illuminated sighting system.
Figure 4B:
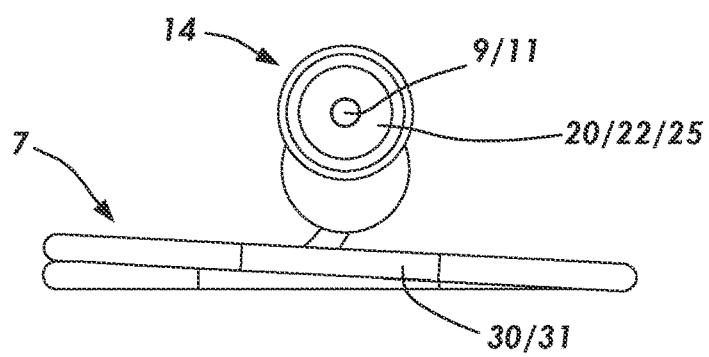
FIG. 4B is a front view of the particular embodiment of the first and second light conductive members shown in FIG. 4A.
Figure 4C:
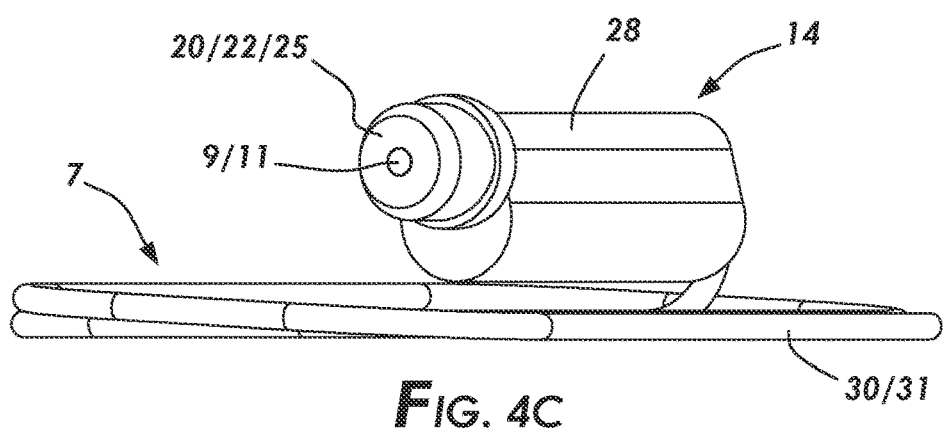
FIG. 4C is an angled side view of the particular embodiment of the first and second light conductive members shown in FIG. 4A.

Now referring primarily to FIGS. 4A through 4C, significantly, for use with the present invention, the second light conductive member viewing end (22) can dispose about, such as entirely about, the first light conductive member viewing end (11). Said another way, the second light conductive member viewing end (22) can radially surround, such as entirely radially surround, the first light conductive member viewing end (11). Following, the second light conductive member viewing end (22) can include an opening (24) which passes axially therethrough; correspondingly, the second light conductive member viewing end (22) can have an annular or ring-shaped area. The first light conductive member viewing end (11) can be received within the opening (24) to dispose the second light conductive member viewing end (22) about the first light conductive member viewing end (11).

As to particular embodiments, the second light conductive member viewing end (22) can be concentrically disposed about the first light conductive member viewing end (11).

As to particular embodiments, the second light conductive member viewing end (22) can be coaxially disposed about the first light conductive member viewing end (11).

As to particular embodiments, the second light conductive member viewing end (22) which includes an annular area (25) can have a constant radial portion (26) between its internal and external surfaces (27)(28) about the first light conductive member viewing end (11) (as shown in FIGS. 7B, 7D, and 7F).

Figure 6:
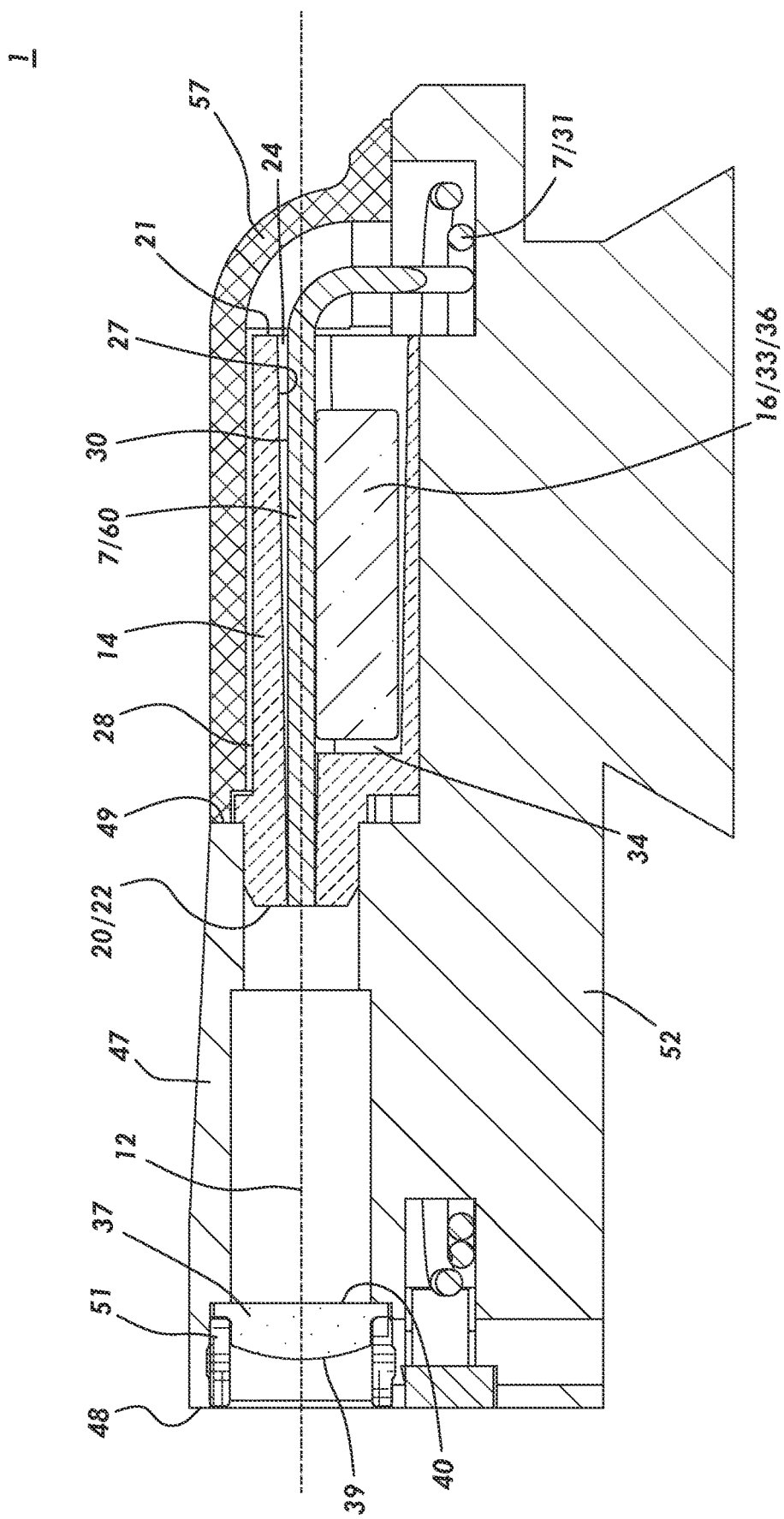
FIG. 6 is a cross-sectional view of the particular embodiment of the inventive illuminated sighting system shown in FIG. 2B.

Now referring primarily to FIG. 6, as to particular embodiments, the first and second light conductive member viewing ends (11)(22) can be coplanar or flush.

The first and second light conductive member viewing ends (11)(22) and correspondingly the first and second viewable aiming indicia (4)(6) can provide different images to indicate the respective alignment or misalignment of the firearm (2) with the target (3). As to particular embodiments, the first and second viewable aiming indicia (4)(6) can be visible in an illumination field (29) which can be the viewable area of the illuminated sighting system (1) that indicates said alignment or misalignment when viewed by the shooter. As to particular embodiments, the illumination field (29) can comprise a circular area of light. Typically, when aligning the firearm (2) with the target (3), substantially only one or the other of the first and second viewable aiming indicia (4)(6) can be visible in (or fill) the illumination field (29) at any one time, depending of course upon the alignment or misalignment of the firearm (2) with the target (3).

As but one nonlimiting example, the first and second viewable aiming indicia (4)(6) can comprise different colors of light perceivable to the shooter. Again as a nonlimiting example, the first viewable aiming indicium (4) can be a green circle which indicates alignment of the firearm (2) with the target (3), and the second viewable aiming indicium (6) can be a red circle which indicates misalignment of the firearm (2) with the target (3).

For disposition of the second light conductive member viewing end (22) about the first light conductive member viewing end (11), the second light conductive member (14) (or a portion thereof) can be disposed adjacent to or directly adjacent to the first light conductive member (7) (or a portion thereof) and in particular, adjacent to or directly adjacent to a first light conductive member external surface (30), at least proximate the first and second light conductive member viewing ends (11)(22). As to particular embodiments, the second light conductive member (14) (or a portion thereof) can be disposed about, such as entirely about, the first light conductive member (7) (or a portion thereof), at least proximate the first and second light conductive member viewing ends (11)(22). Following, the second light conductive member (14) (or a portion thereof) can include an opening (24) which passes axially therethrough, such as along a longitudinal axis of the second light conductive member (14) between the second light conductive member first and second ends (20)(21), whereby the opening (24) can be defined by the second light conductive member internal surface (27). Correspondingly, the second light conductive member (14) (or a portion thereof) can be configured as an annular or ring-shaped member. The first light conductive member (7) (or a portion thereof) can be received within the opening (24) to dispose the second light conductive member (14) (or a portion thereof) about the first light conductive member (7), at least proximate the first and second light conductive member viewing ends (11)(22). Accordingly, the first light conductive member external surface (30) can be adjacent to or directly adjacent to the second light conductive member internal surface (27), at least proximate the first and second light conductive member viewing ends (11)(22).

Said another way, the second light conductive member (14) (or a portion thereof) can radially surround, such as entirely radially surround, the first light conductive member (7) (or a portion thereof), at least proximate the first and second light conductive member viewing ends (11)(22).

As to particular embodiments, the second light conductive member (14) (or a portion thereof) can be concentrically disposed about the first light conductive member (7) (or a portion thereof), at least proximate the first and second light conductive member viewing ends (11)(22).

As to particular embodiments, the second light conductive member (14) (or a portion thereof) can be coaxially disposed about the first light conductive member (7) (or a portion thereof), at least proximate the first and second light conductive member viewing ends (11)(22).

As to particular embodiments, the second light conductive member (14) (or a portion thereof) can have a constant radial portion (26) between its internal and external surfaces (27)(28) about the first light conductive member (7) (or a portion thereof), at least proximate the first and second light conductive member viewing ends (11)(22).

Regarding construction, a light conductive member (7) (14) can be fabricated as a lite pipe or optical fiber from a numerous and wide variety of light conductive materials, including but not limited to plastic (such as polystyrene, polycarbonate, polyvinylchloride, TEFLON™, nylon, polystyrene, polyurethane, acrylic, polyethylene terphthalate, polyethersulfone, polymethylmethacrylate, or the like, or combinations thereof), whereby one or more additives may be added to the material(s) to aid in light conductivity. Consequent to the light conductive material(s) and/or the constructional form of the light conductive member (7)(14), total internal reflection, substantial internal reflection, or a desired amount of internal reflection of light (15) incident upon the light conductive member (7)(14) can be achieved, allowing respective transmission of all, substantially all, or a desired amount of light (15) internally toward the light conductive member viewing end (11)(22) for emission as an amount of emitted light (17)(23) which provides a viewable aiming indicium (4)(6).

As to particular embodiments, a light conductive member (7)(14) can include cladding or a layer of material with a lower refractive index which contacts, such as surrounds, the core light conductive material (or fiber) which has a higher refractive index. The difference in the refractive indices causes total internal reflection to occur at the core-cladding boundary along the length of the fiber; correspondingly light (15) is transmitted through the fiber and does not escape through the sides of the fiber. Following, the cladding serves to confine the light (15) to the core of the light conductive member (7)(14).

As to particular embodiments, a light conductive member (7)(14) can include or contain one or more dopants, colorants, or combinations thereof, as described in U.S. Pat. Nos. 8,925,237 and/or 10,088,274 and/or 10,760,877, all of which are incorporated by reference in their entirety herein. The dopant(s), colorant(s), or a combination thereof can result in the amount of emitted light (17)(23) and the viewable aiming indicium (4)(6) having a color perceivable to the shooter.

Regarding fabrication, a light conductive member (7)(14) can be molded, extruded, cast, or made by other processes as a numerous and wide variety of elongate constructional forms having various lengths, widths, and thicknesses, whereby exemplary cross-sectional configurations can include circular, oval, elliptical, triangular, square, rectangular, polygonal, or the like. As but one illustrative example, an elongate light conductive member (7)(14) can be configured as a cylinder or can have a generally cylindrical shape with a generally circular cross-section. As to these particular embodiments, the light conductive member viewing end (11)(22) can have a generally circular area, which may provide a generally circular viewable aiming indicium (4) (6).

As stated above, a light conductive member (7)(14) can (i) receive light (15) incident thereupon from one or more light sources (16), and (ii) transmit at least a portion of the light (15) internally toward the light conductive member viewing end (11)(22) for emission as an amount of emitted light (17)(23) which provides a viewable aiming indicium (4)(6). As to particular embodiments, the light (15) can be incident upon the light conductive member external surface (30)(28) such that it receives the light (15) for internal transmission within the light conductive member (7)(14), whereby the light conductive member external surface (30)(28) can include the external surface which defines (i) the light conductive member sidewall extending between light conductive member first and second ends (9)(20)(10)(21) along the light conductive member length (8)(19) and/or (ii) the light conductive member second end (10)(21), depending upon the embodiment.

As to particular embodiments, a light conductive member (7)(14) can be configured to have a significant (or substantial or considerable or sizable or ample) light conductive member external surface area to facilitate the reception of a respectively significant amount of light (15) which results in the amount of emitted light (17)(23) having a desired brightness; as would be understood, the light conductive member external surface area can be directly proportional to the amount of emitted light (17)(23) and correspondingly, the brightness of the viewable aiming indicium (4)(6).

Figure 9A:
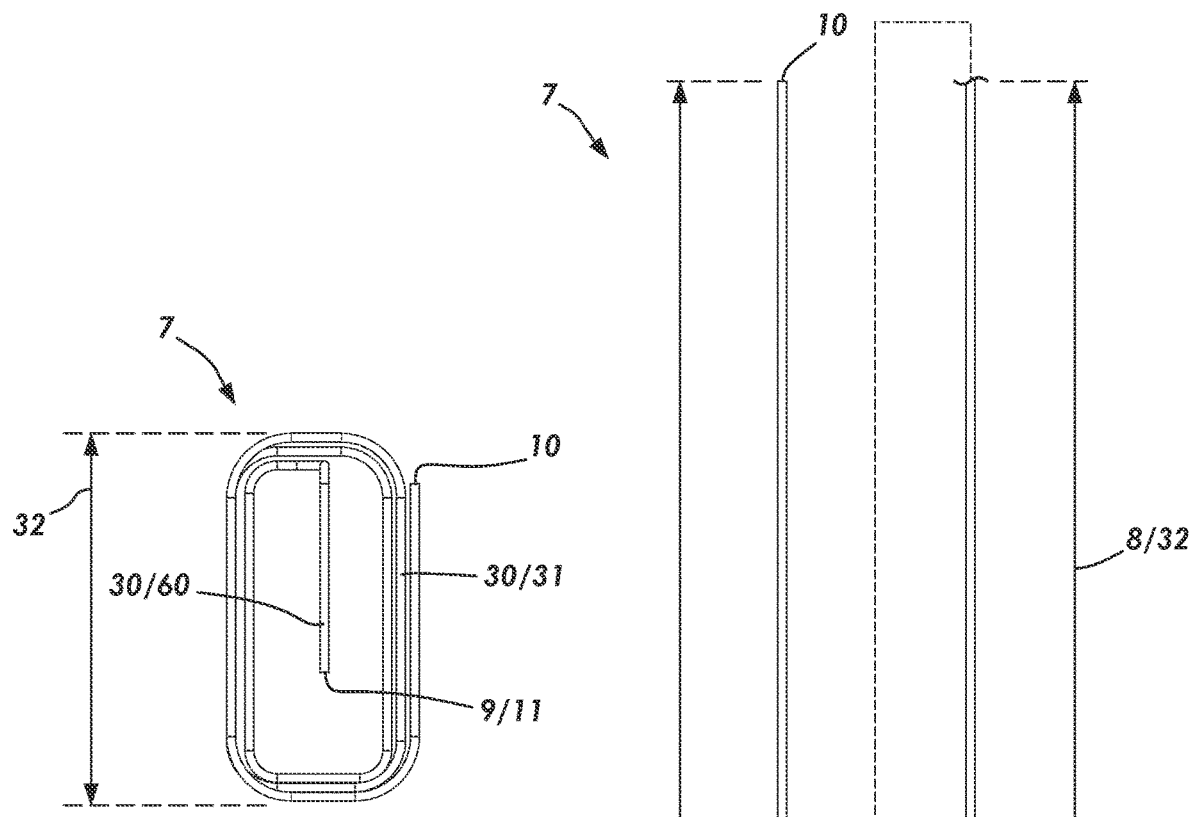
FIG. 9A is a top view of a particular embodiment of a first light conductive member of the inventive illuminated sighting system, whereby the first light conductive member length includes a linear portion and a coiled portion.
Figure 9B:
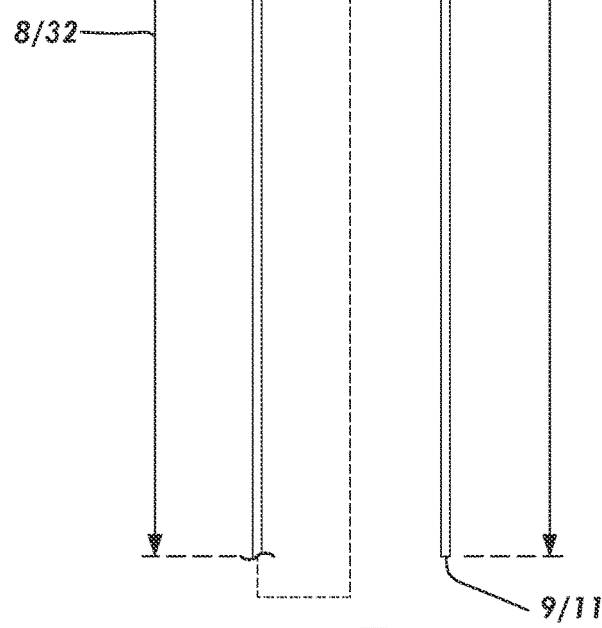
FIG. 9B is a top view of the particular embodiment of the first light conductive member shown in FIG. 9A, but whereby the first light conductive member length is entirely linear, thus not having the coiled portion.

Following, a light conductive member (7)(14) can be made to have a length, width, thickness, and/or configuration which provides a sizable light conductive member external surface area. As an illustrative example, a light conductive member (7)(14) can include a light conductive member length (8)(19) having a coiled portion (31) which can condense or compact the light conductive member length (8)(19) relative to the same light conductive member (7)(14) having an entirely linear light conductive member length (8)(19) (as shown in FIGS. 9A and 9B); consequently, the former can have a shorter light conductive member footprint length (32) than the latter. As to particular embodiments, the coiled portion (31) can be proximate and/or include the light conductive member second end (10)(21).

Now regarding reception of light (15) by the light conductive member (7)(14), the corresponding light source (16) can include one or more of any light sources which emit light (15) in one or more of the ultraviolet, visible, or infrared spectrums, as described in U.S. Pat. Nos. 8,925,237 and/or 10,088,274 and/or 10,760,877 all of which are incorporated by reference in their entirety herein.

As to particular embodiments, a light source (16) can be ambient light, meaning light coming from the surrounding area or environment. As but one illustrative example, an ambient light source (16) can be sunlight incident upon the light conductive member external surface (30)(28), whereby the light conductive member (7)(14) can transmit at least a portion of the sunlight internally toward the light conductive member viewing end (11)(22) for emission as an amount of emitted light (17)(23) which provides a viewable aiming indicium (4)(6) that indicates alignment (first viewable aiming indicium (4)) or misalignment (second viewable aiming indicium (6)) of the firearm (2) with the target (3), such as in bright light conditions.

For use in low light conditions and/or to supplement in bright light conditions, the illuminated sighting system (1) can further include at least one light-emitting element (33), such as an artificial or man-made light-emitting element (33), disposed proximate a light conductive member (7)(14), whereby the light-emitting element (33) can provide a light source (16) and corresponding light (15) for incidence upon the light conductive member (7)(14). Following, the light conductive member (7)(14) can transmit at least a portion of this light (15) internally toward the light conductive member viewing end (11)(22) for emission as an amount of emitted light (17)(23) which provides a viewable aiming indicium (4)(6) that indicates alignment (first viewable aiming indicium (4)) or misalignment (second viewable aiming indicium (6)) of the firearm (2) with the target (3).

A light-emitting element (33) can comprise or can be selected from the group consisting of: light-emitting diodes, luminescent paints, chemiluminescent elements, electroluminescent conductors, radioluminescent elements, or the like, or combinations thereof.

As to particular embodiments, a light-emitting element (33) can be a radioluminescent element comprising a radionucleotide which emits beta radiation. As but one illustrative example, the radionucleotide can include tritium, and the light-emitting element (33) can be configured as a gaseous tritium light source, as described in U.S. Pat. Nos. 8,925,237 and/or 10,088,274 and/or 10,760,877, all of which are incorporated by reference in their entirety herein. The gaseous tritium light source can include a glass form, such as a capillary, which can be internally coated with a luminescent substance (for example, zinc sulphide powder) and filled with tritium gas, whereby the luminescent coating can convert kinetic energy of electrons into light. The kinetic energy can be generated from the tritium gas; the tritium nucleus slowly decays, emitting electrons in the process. When the electrons hit the luminescent coating, energy is emitted in the form of light (15). As but one illustrative example, gaseous tritium light sources which may be useful with the present invention can be obtained from mb-microtec ag headquartered in Switzerland, or the like.

As to particular embodiments, a light-emitting element (33) can be disposed adjacent to a light conductive member (7)(14) or a portion thereof, such as adjacent to the light conductive member length (8)(19) which defines the light conductive member sidewall extending between the light conductive member first and second ends (9)(20)(10)(21).

As to particular embodiments, a light-emitting element (33) can be disposed adjacent to a light conductive member external surface (30)(28) or a portion thereof; following, at least a portion of the light (15) incident upon the light conductive member external surface (30)(28) can be transmitted internally toward the light conductive member viewing end (11)(22) for emission as an amount of emitted light (17)(23) which provides a viewable aiming indicium (4)(6) that indicates alignment (first viewable aiming indicium (4)) or misalignment (second viewable aiming indicium (6)) of the firearm (2) with the target (3), even in low light conditions or in the absence of light.

As to other particular embodiments, a light-emitting element (33) can be disposed adjacent to the light conductive member internal surface (27) or a portion thereof; following, at least a portion of the light (15) incident upon the light conductive member internal surface (27) can be transmitted internally toward the light conductive member viewing end (11)(22) for emission as an amount of emitted light (17)(23) which provides a viewable aiming indicium (4)(6) that indicates alignment (first viewable aiming indicium (4)) or misalignment (second viewable aiming indicium (6)) of the firearm (2) with the target (3), even in low light conditions or in the absence of light.

As to particular embodiments having a light-emitting element (33) disposed adjacent to a light conductive member internal surface (27), the light-emitting element (33) can be located within a chamber (34), such as a longitudinal bore, disposed inside of or contained within the light conductive member (7)(14), as described in U.S. Pat. Nos. 8,925,237 and/or 10,088,274 and/or 10,760,877, all of which are incorporated by reference in their entirety herein. As to particular embodiments, the chamber (34) can be defined, either partially or entirely, by the light conductive member internal surface (27); thus, the light conductive member internal surface (27) can provide one or more chamber walls which define the chamber (34) disposed inside of the light conductive member (7)(14).

As to particular embodiments, the illuminated sighting system (1) can include only one light-emitting element (33) disposed adjacent to both the first and second light conductive members (7)(14), whereby this light-emitting element (33) can provide a light source (16) and corresponding light (15) for incidence upon both the first and second light conductive members (7)(14) which can subsequently be emitted to provide the respective first and second viewable aiming indicia (4)(6). As but one illustrative example of this embodiment, a light-emitting element (33) can be disposed adjacent to both the first light conductive member external surface (30) and the second light conductive member external surface (28) to provide corresponding light (15) for incidence upon both the first light conductive member external surface (30) and the second light conductive member external surface (28). As but another illustrative example of this embodiment, a light-emitting element (33) can be located within a chamber (34) disposed inside of one of the first or second light conductive members (7)(14) to provide corresponding light (15) for incidence upon the respective light conductive member internal surface (27); additionally, this light-emitting element (33) can further be disposed adjacent to the other of the first or second light conductive member external surface (30)(28) to provide corresponding light (15) for incidence upon the respective light conductive member external surface (30)(28).

Figure 5C:
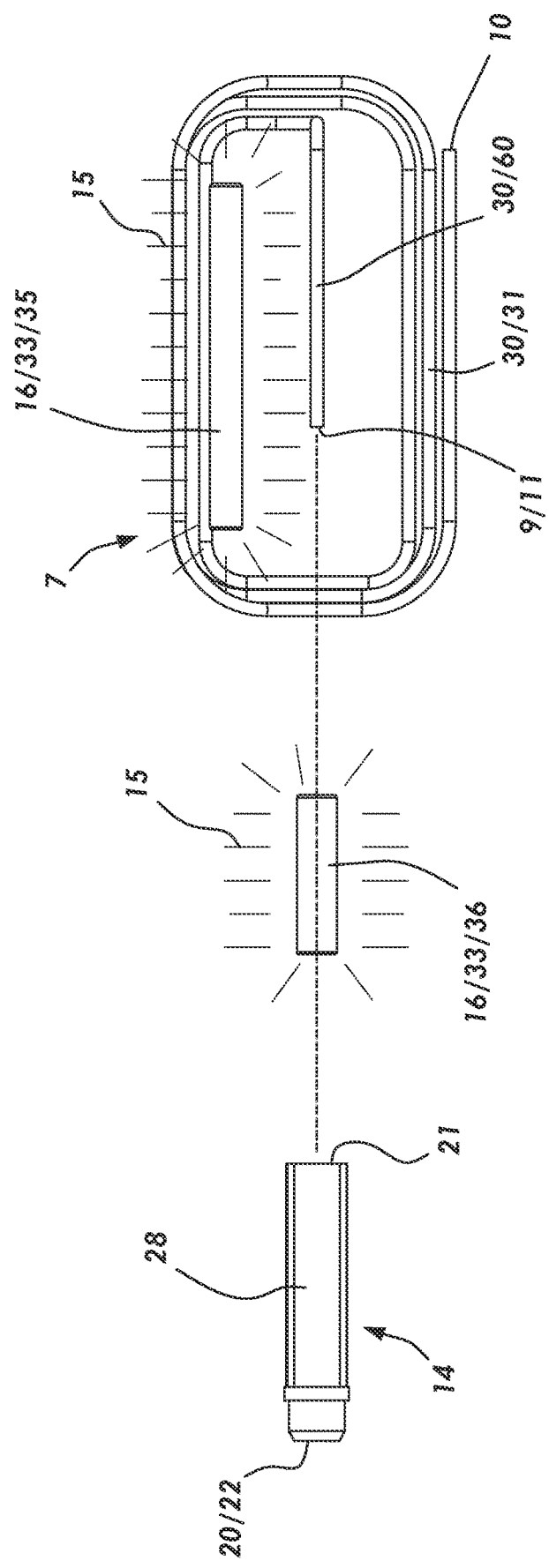
FIG. 5C is an exploded top view of the particular embodiment of the first and second light conductive members and corresponding first and second light emitting elements shown in FIG. 5A.

Now referring primarily to FIGS. 5A through 5C, as to other particular embodiments, the illuminated sighting system (1) can include a plurality of light-emitting elements (33), such as a first light-emitting element (35) disposed adjacent to the first light conductive member (7), the first light-emitting element (35) providing light (15) for incidence upon the first light conductive member (7) and subsequent emission from the first light conductive member viewing end (11), thereby generating the first viewable aiming indicium (4). In addition, the illuminated sighting system (1) can further include a second light-emitting element (36) disposed adjacent to the second light conductive member (14), the second light-emitting element (36) providing light (15) for incidence upon the second light conductive member (14) and subsequent emission from the second light conductive member viewing end (22), thereby generating the second viewable aiming indicium (6). As but one illustrative example of this embodiment, a first light-emitting element (35) can be disposed adjacent to the first light conductive member external surface (30) to provide corresponding light (15) incident thereupon, and a second light-emitting element (36) can be located within a chamber (34) disposed inside of the second light conductive member (14) to provide corresponding light (15) incident upon the second light conductive member internal surface (27).

Now referring primarily to FIG. 6, as to particular embodiments, the second light conductive member (14) can include both (i) a chamber (34) and corresponding second light-emitting element (36) disposed therein, and (ii) the above-described opening (24) which passes axially therethrough and receives the first light conductive member (7) to locate the second light conductive member (14) about the first light conductive member (7), at least proximate the first and second light conductive member viewing ends (11)(22). The chamber (34) and the opening (24) can communicate with one another or can each be separately enclosed, depending upon the embodiment.

Now referring primarily to FIGS. 3A, 3B, and 6 through 7F, the illuminated sighting system (1) can further include a lens (37) disposed in axially spaced-apart relation to the first and second light conductive member viewing ends (11)(22).

In use, the lens (37) can be disposed between (i) the first and second light conductive member viewing ends (11)(22) and (ii) the aiming eye (5) of the shooter; when the firearm (2) is aligned with the target (3), the shooter's line of sight (18) can pass through the lens (37) and in particular, through the center of the lens (37), and through the center of the first light conductive member viewing end (11) (and correspondingly the center of the first viewable aiming indicium (4)) to the target (3). Following, the center of the lens (37) can be axially aligned with the center of the first light conductive member viewing end (11); accordingly, the sight axis (12) can pass axially through the center of the lens (37).

The lens (37) can be configured to magnify the area of the first light conductive member viewing end (11) and correspondingly the first amount of emitted light (17) to fill the illumination field (29) viewed by the shooter, whereby the illumination field (29) can be in the image plane (38). Consequently, such a filled illumination field (29) can provide the first viewable aiming indicium (4), such as a circular area of light (15), for example a circular area of green light, which can have a substantially uniform brightness over the illumination field (29).

Additionally, the lens (37) can be configured to magnify a portion of the area of the second light conductive member viewing end (22) and correspondingly a portion of the second amount of emitted light (23) to fill the illumination field (29) viewed by the shooter. Consequently, such a filled illumination field (29) can provide the second viewable aiming indicium (6), such as a circular area of light (15) derived from a portion of the annular area (25) of light (15) provided by the second amount of emitted light (23), for example a circular area of red light, which can have a substantially uniform brightness over the illumination field (29).

Typically, when aligning the firearm (2) with the target (3), the illumination field (29) will be filled by substantially only one or the other of the first amount of emitted light (17) or a portion of the second amount of emitted light (23) and correspondingly provide only one or the other of the respective first viewable aiming indicium (4) or the second viewable aiming indicium (6) at any one time to indicate the respective alignment or misalignment of the firearm (2) with the target (3). For example, the illumination field (29) will be filled by substantially only one or the other of green light or red light at any one time to indicate the respective alignment or misalignment of the firearm (2) with the target (3).

Now referring primarily to FIG. 6, the lens (37) can be a monofocal lens, as opposed to a multifocal lens. Further, the lens (37) can include a convex surface (39) which faces away from the first and second light conductive member viewing ends (11)(22); correspondingly, in use, the convex surface (39) can be oriented toward the shooter for viewing by their aiming eye (5). As to particular embodiments, the lens (37) can further include a plane (or flat) surface (40) which faces toward the first and second light conductive member viewing ends (11)(22). As to particular embodiments, the lens (37) can be a plano-convex lens.

The convex surface (39) of the lens (37) which faces away from the first and second light conductive member viewing ends (11)(22) provides a focal point (41) between the lens (37) and the first and second light conductive member viewing ends (11)(22). The distance between the optical center of the lens (37) and the focal point (41) is the focal length (42), whereby the focal length (42) is associated with the angle of view (43) which dictates the field of view (FOV) (44) or the object plane or the observable area imaged by the lens (37) and provided in the illumination field (29). Typically, the longer the focal length (42), the narrower the angle of view (43) and the corresponding field of view (44) and the higher the magnification; the shorter the focal length (42), the wider the angle of view (43) and the corresponding field of view (44) and the lower the magnification. In the present invention, the field of view (44) or the object plane or the observable area imaged by the lens (37) and provided in the illumination field (29) can be beyond the focal point (41). Correspondingly, the focal length (42) of the lens (37) can be lesser than the distance between the lens (37) and the first and second light conductive member viewing ends (11)(22). Said another way, the distance between the lens (37) and the first and second light conductive member viewing ends (11)(22) can be greater than the focal length (42) of the lens (37).

The focal length (F) of the convex lens (37) can be calculated by the formula F=R/(N−1), where R is the radius of curvature of the lens (37) and N is the refractive index of the lens medium. For most polymers, the refractive index can be about 1.5, which simplifies the focal length (F) calculation to Equation I:

$$F=2R$$

Significantly, for use with the present invention, the lens (37) can be configured and positioned relative to the first light conductive member viewing end (11) such that its field of view (44) can have a boundary or perimeter, such as a circumference, which can be substantially the same as the perimeter, such as the circumference, of the first light conductive member viewing end (11). As to particular embodiments, the lens (37) can be configured and positioned relative to the first light conductive member viewing end (11) such that its field of view (44) can have a diameter which can be substantially the same as the diameter of the first light conductive member viewing end (11).

The term "circumference" as used herein means the external boundary or surface of an object, whereby the object may but need not be a circle.

The term "diameter" as used herein means the length of a line through the center of an object, whereby the object may but need not be a circle.

Significantly, for use with the present invention, when the sight axis (12) which passes axially through the center of the lens (37) and the center of the first light conductive member viewing end (11) is aligned with a shooter's line of sight (18), the lens (37) can be configured and positioned relative to the first light conductive member viewing end (11) to provide a field of view (44) having a boundary or perimeter, such as a circumference, which can substantially align with the perimeter or circumference of the first light conductive member viewing end (11). Said another way, when the sight axis (12) which passes axially through the center of the lens (37) and the center of the first light conductive member viewing end (11) is aligned with a shooter's line of sight (18), the lens (37) can be configured and positioned relative to the first light conductive member viewing end (11) to provide a field of view (44) which comprises the first light conductive member viewing end (11). Said another way, when the sight axis (12) which passes axially through the center of the lens (37) and the center of the first light conductive member viewing end (11) is aligned with a shooter's line of sight (18), the lens (37) can be configured and positioned relative to the first light conductive member viewing end (11) to provide a field of view (44) which comprises only the first light conductive member viewing end (11). Said another way, when the sight axis (12) which passes axially through the center of the lens (37) and the center of the first light conductive member viewing end (11) is aligned with a shooter's line of sight (18), the lens (37) can be configured and positioned relative to the first light conductive member viewing end (11) to provide a field of view (44) which consists essentially of the first light conductive member viewing end (11). Said another way, when the sight axis (12) which passes axially through the center of the lens (37) and the center of the first light conductive member viewing end (11) is aligned with a shooter's line of sight (18), the lens (37) can be configured and positioned relative to the first light conductive member viewing end (11) to provide a field of view (44) which consists of the first light conductive member viewing end (11). As a result, only the first viewable aiming indicium (4) can be visible to the aiming eye (5) of the shooter when the firearm (2) is aligned with the target (3).

Mathematically, for a chosen (i) lens (37) having a diameter (D) and a focal length (F) and (ii) first light conductive member viewing end (11) having a diameter (d), the distance ($x_{end \to fp}$) of first light conductive member viewing end (11) from the focal point (fp) of the lens (37) can be calculated by Equation II:

$$x_{end \to fp} = \frac{dF}{D}$$

Following, the distance ($x_{end \to lens}$) of first light conductive member viewing end (11) from the lens (37) (and in particular, from the image plane (38) or illumination field (29)) can be calculated by Equation III:

$$x_{end \to lens} = F + \frac{dF}{D}$$

As stated above, the lens (37) can be configured to magnify (i) the area of the first light conductive member viewing end (11) and correspondingly the first amount of emitted light (17) or (ii) a portion of the area of the second light conductive member viewing end (22) and correspondingly a portion of the second amount of emitted light (23) to fill the illumination field (29) viewed by the shooter.

As to particular embodiments, the lens (37) can be configured and positioned relative to the first light conductive member viewing end (11) to magnify (i) the area of the first light conductive member viewing end (11) and correspondingly the first amount of emitted light (17) or (ii) a portion of the area of the second light conductive member viewing end (22) and correspondingly a portion of the second amount of emitted light (23) by at least 2× to fill the illumination field (29).

As to particular embodiments, the lens (37) can be configured and positioned relative to the first light conductive member viewing end (11) to magnify (i) the area of the first light conductive member viewing end (11) and correspondingly the first amount of emitted light (17) or (ii) a portion of the area of the second light conductive member viewing end (22) and correspondingly a portion of the second amount of emitted light (23) by at least 3× to fill the illumination field (29).

As to particular embodiments, the lens (37) can be configured and positioned relative to the first light conductive member viewing end (11) to magnify (i) the area of the first light conductive member viewing end (11) and correspondingly the first amount of emitted light (17) or (ii) a portion of the area of the second light conductive member viewing end (22) and correspondingly a portion of the second amount of emitted light (23) by at least 4x to fill the illumination field (29).

As to particular embodiments, the lens (37) can be configured and positioned relative to the first light conductive member viewing end (11) to magnify (i) the area of the first light conductive member viewing end (11) and correspondingly the first amount of emitted light (17) or (ii) a portion of the area of the second light conductive member viewing end (22) and correspondingly a portion of the second amount of emitted light (23) by at least 5x to fill the illumination field (29).

As to particular embodiments, the lens (37) can be configured and positioned relative to the first light conductive member viewing end (11) to magnify (i) the area of the first light conductive member viewing end (11) and correspondingly the first amount of emitted light (17) or (ii) a portion of the area of the second light conductive member viewing end (22) and correspondingly a portion of the second amount of emitted light (23) by at least 6x to fill the illumination field (29).

To meet the above criteria, the lens (37) (in particular the optical center of the lens (37)) and the first light conductive member viewing end (11) can be disposed in axially spaced-apart relation, whereby the distance therebetween can be at least 10x the diameter of the first light conductive member viewing end (11). As to particular embodiments, the lens (37) (in particular the optical center of the lens (37)) and the first light conductive member viewing end (11) can be disposed in axially spaced-apart relation, whereby the distance therebetween can be at least 15x the diameter of the first light conductive member viewing end (11). As to particular embodiments, the lens (37) (in particular the optical center of the lens (37)) and the first light conductive member viewing end (11) can be disposed in axially spaced-apart relation, whereby the distance therebetween can be at least 20x the diameter of the first light conductive member viewing end (11). As to particular embodiments, the lens (37) (in particular the optical center of the lens (37)) and the first light conductive member viewing end (11) can be disposed in axially spaced-apart relation, whereby the distance therebetween can be at least 25x the diameter of the first light conductive member viewing end (11). As to particular embodiments, the lens (37) (in particular the optical center of the lens (37)) and the first light conductive member viewing end (11) can be disposed in axially spaced-apart relation, whereby the distance therebetween can be at least 30x the diameter of the first light conductive member viewing end (11).

As but one illustrative example which meets the above criteria, a particular embodiment of the present illuminated sighting system (1) can include (i) a lens (37) made from nylon and having a diameter of about 0.122 inches and a radius of curvature of about 0.24 inches, and (ii) a first light conductive member (7) having a first light conductive member viewing end (11) with a diameter of about 0.02 inches, whereby the lens (37) (in particular the optical center of the lens (37)) and the first light conductive member viewing end (11) can be disposed in axially spaced-apart relation with a distance of about 0.559 inches therebetween. As to this particular embodiment, the illumination field (29) can have an area of about 0.122 inches and the first light conductive member viewing end (11) can be magnified by about 6.1x.

As to particular embodiments, the firearm (2) can be considered as aligned with the target (3) when the sight axis (12) is at an angle of not greater than about ±1° relative to the shooter's line of sight (18). Following, when the sight axis (12) is at an angle of greater than about ±1° relative to the shooter's line of sight (18), the firearm (2) can be considered misaligned with the target (3).

As to particular embodiments, the firearm (2) can be considered as aligned with the target (3) when the sight axis (12) is at an angle of not greater than about ±1.5° relative to the shooter's line of sight (18). Following, when the sight axis (12) is at an angle of greater than about ±1.5° relative to the shooter's line of sight (18), the firearm (2) can be considered misaligned with the target (3).

As to particular embodiments, the firearm (2) can be considered as aligned with the target (3) when the sight axis (12) is at an angle of not greater than about ±2° relative to the shooter's line of sight (18). Following, when the sight axis (12) is at an angle of greater than about ±2° relative to the shooter's line of sight (18), the firearm (2) can be considered misaligned with the target (3).

Now referring primarily to FIGS. 7B, 7D, and 7F, regarding the second light conductive member viewing end (22) which includes an annular area (25) having a constant radial portion (26) between its internal and external surfaces (27)(28) about the first light conductive member viewing end (11), the radial portion (26) can have a radial portion length (45) which extends between the second light conductive member viewing end internal and external surfaces (27)(28), whereby the radial portion length (45) can be equal to the diameter of the first light conductive member viewing end (11). Correspondingly, the radial portion (26) can be disposed in the field of view (44) and fill the illumination field (29) when the shooter's line of sight falls adjacently outside of the perimeter, such as a circumference, of the first light conductive member viewing end (11) which can occur when the firearm (2) is not aligned with the target (3).

As to particular embodiments, the radial portion (26) can have a radial portion length (45) which can be (i) not less than or (ii) greater than the diameter of the first light conductive member viewing end (11), whereby a greater radial portion length (45) allows for the indication of greater misalignment of the firearm (2) with the target (3) as compared to a lesser radial portion length (45). Said another way, a greater radial portion length (45) allows for the indication of misalignment of the firearm (2) with the target (3) resulting from a greater angle between the sight axis (12) relative to the shooter's line of sight (18) as compared to a lesser radial portion length (45). For example, the second viewable aiming indicium (6), such as a circular area of light (15) derived from a portion of the annular area (25) of light (15) provided by the second amount of emitted light (23), can fill the illumination field (29) viewed by the shooter when the sight axis (12) is at an angle of greater than about ±1° or greater than about ±1.5° or greater than about ±2°, depending upon the embodiment, relative to the shooter's line of sight (18) to indicate misalignment. As to particular embodiments, the second viewable aiming indicium (6), such as a circular area of light (15) derived from a portion of the annular area (25) of light (15) provided by the second amount of emitted light (23), can fill the illumination field (29) viewed by the shooter when the sight axis (12) is at an angle of between about ±1° to about ±5° or between about ±1.5° to about ±5° or between about ±2° to about ±5°, depending upon the embodiment, relative to the shooter's line of sight (18).

Now referring primarily to FIGS. 2A through 3B, the illuminated sighting system (1) can further include a tube (46) disposed between the axially spaced-apart (i) lens (37)

and (ii) first and second light conductive member viewing ends (11)(22), whereby the tube (46) can provide a passageway through which the first and second amounts of emitted light (17)(23) can travel. The tube (46) can comprise a tube sidewall (47) extending between opposing tube first and second ends (48)(49) along a tube length (50), whereby the lens (37) can be proximate the tube first end (48) and the first and second light conductive member viewing ends (11)(22) can be proximate the tube second end (49).

To provide a sufficient passageway for travel of the first and second amounts of emitted light (17)(23), the tube sidewall (47) can be substantially opaque, thus precluding the first and second amounts of emitted light (17)(23) from escaping through the tube sidewall (47).

As stated above, the lens (37) can be proximate the tube first end (48). As to particular embodiments, the lens (37) can be coupled or connected to the tube first end (48), for example via the perimeter of the lens (37), which can close the passageway extending between the tube first and second ends (48)(49). As but one illustrative example, the lens (37) can be coupled or connected to the tube first end (48) via a retaining ring (51).

The tube (46) can have a tube length (50) which can be sufficient to accommodate the required distance between the lens (37) and the first light conductive member viewing end (11) to fill the illumination field (29) with the first viewable aiming indicium (4) when the firearm (2) is aligned with the target (3), whereby the distance can be related to the focal length (42) of the lens (37), the diameter of the lens (37), and the diameter of the first light conductive member viewing end (11), as detailed above.

Now referring primarily to FIG. 6, the first and second light conductive member viewing ends (11)(22) can be proximate the tube second end (49), whereby as to particular embodiments, the first and second light conductive member viewing ends (11)(22) extend into the tube (46) from the tube second end (49) a distance sufficient to dispose the first light conductive member viewing end (11) at a distance from the lens (37) which fills the illumination field (29) with the first viewable aiming indicium (4) when the firearm (2) is aligned with the target (3).

Now referring primarily to FIGS. 2A through 3B, the illuminated sighting system (1) can further include a housing (52) configured to house at least the first and second light conductive members (7)(14), the lens (37), the tube (46), and one or more light-emitting elements (33), whereby the housing (52) can have a configuration capable of retaining the illuminated sighting system (1) in fixed relation to the firearm (2), such as proximate the barrel (13), for aiming of the firearm (2), as described above. For this fixed relation, which as to particular embodiments, may be releasable or removable as opposed to permanent, a numerous and wide variety of coupling configurations may be employed. Now referring primarily to FIG. 1B, as but one illustrative example, the housing (52) can be configured to mateably engage with a correspondingly configured portion of the firearm (2), such as by sliding engagement which can be maintained via a friction fit.

The housing (52), which may encase all components to provide a single independent unit, can include a housing interior space (53) configured to contain at least the first and second light conductive members (7)(14), the lens (37), and one or more light-emitting elements (33), whereby the housing interior space (53) can be defined, either partially or entirely, by a housing internal surface (54). As to particular embodiments, the tube (46) can be integrated with the housing (52), meaning provided as a one-piece construct.

The housing (52) can further include one or more aperture elements (55), each of which can define an aperture element opening which communicates between the housing interior space (53) and a housing external surface (56). Thus, light (15) from a light source (16) external to the illuminated sighting system (1), such as ambient light coming from the surrounding area or environment, can travel through the aperture element opening for incidence upon the first and second light conductive members (7)(14), such as upon their external surface (30)(28), said light (15) subsequently emitted to provide the respective first and second viewable aiming indicia (4)(6).

As to particular embodiments, the housing (52) can further include a transparent or translucent cover (57) which can be coupled thereto proximate the aperture element (55) to enclose the housing interior space (53) while permitting ambient light through for incidence upon the first and second light conductive members (7)(14).

As to particular embodiments, the housing (52) and/or the cover (57) may be the same as or similar to the corresponding housing and cover disclosed in U.S. patent application Ser. No. 17/845,529, which is incorporated by reference in its entirety herein.

Figure 8:
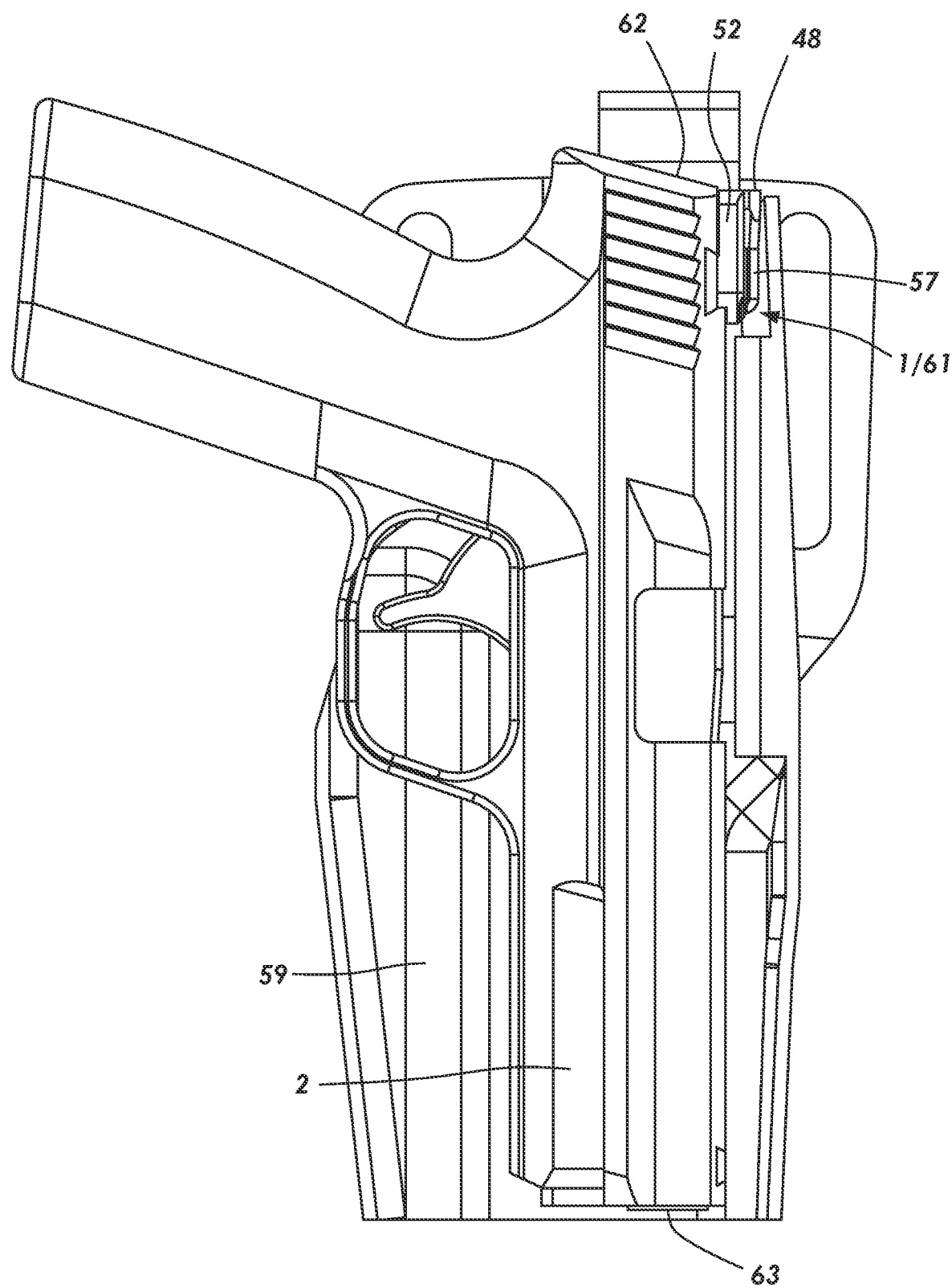
FIG. 8 is a side view of a particular embodiment of the inventive illuminated sighting system coupled to a firearm, both disposed within a holster without mechanically interfering therewith.

Now referring primarily to FIG. 8, the housing (52) can have dimensions sufficient to house at least the first and second light conductive members (7)(14), the lens (37), and one or more light-emitting elements (33). As to particular embodiments, the housing (52) can have a housing length (58) which can be short enough such that the illuminated sighting system (1) does not interfere (such as mechanically) with disposition of the firearm (2) within a holster (59), thus allowing the firearm (2) with the illuminated sighting system (1) to be supported and/or retained by the holster (59) in the same manner as the firearm (2) would be without the illuminated sighting system (1) fixed thereto. Thus, the housing length (58) may be considered relatively short.

To fit within a housing (52) having a relatively short housing length (58), the first light conductive member (7) and/or the second light conductive member (14) can correspondingly have a relatively short light conductive member footprint length (32) which may be accomplished by condensing or compacting the light conductive member length (8)(19). As an illustrative example, the light conductive member length (8)(19) may have a coiled portion (31) (as mentioned above), which can shorten the light conductive member footprint length (32) relative to the same light conductive member (7)(14) having an entirely linear light conductive member length (8)(19) (as shown in FIGS. 9A and 9B).

As to particular embodiments, the first light conductive member length (8) can include a coiled portion (31) proximate the first light conductive member second end (10); additionally, the first light conductive member length (8) can include a linear portion (60) proximate the first light conductive member first end (9), whereby the linear portion (60) may facilitate the disposition of the second light conductive member viewing end (22) about the first light conductive member viewing end (11).

As to particular embodiments, the present illuminated sighting system (1) can be a rear sight (61) for use at the proximal end (62) of a firearm (2), whereby the illuminated sighting system (1) can be used with or without a cooperative front sight, depending upon the embodiment.

As to particular embodiments, the present illuminated sighting system (1) can be a front sight for use at the distal end (63) of a firearm (2), whereby the illuminated sighting system (1) can be used with or without a cooperative rear sight (61), depending upon the embodiment.

Now regarding production, a method of making a particular embodiment of the illuminated sighting system (1) can include providing a first light conductive member (7) having a first light conductive member first end (9) which provides a first light conductive member viewing end (11), whereby the first light conductive member (7) can be configured to (i) receive light (15) from one or more light sources (16), and (ii) transmit at least a portion of the light (15) internally toward the first light conductive member viewing end (11) for emission as a first amount of emitted light (17) which provides a first viewable aiming indicium (4) that indicates alignment of a firearm (2) with a target (3); disposing a second light conductive member viewing end (22) of a second light conductive member (14) about the first light conductive member viewing end (11), the second light conductive member (14) having a second light conductive member first end (20) which provides the second light conductive member viewing end (11), whereby the second light conductive member (14) can be configured to (i) receive light (15) from one or more light sources (16), and (ii) transmit at least a portion of the light (15) internally toward the second light conductive member viewing end (22) for emission as a second amount of emitted light (23) which provides a second viewable aiming indicium (6) that indicates misalignment of the firearm (2) with the target (3); and operably coupling a lens (37) to the first and second light conductive member viewing ends (11)(22).

The method of making the illuminated sighting system (1) can further include providing additional components of the illuminated sighting system (1), as described above and in the claims.

Now regarding use, a method of using a particular embodiment of the illuminated sighting system (1) to aid in aiming a firearm (2) can include obtaining the illuminated sighting system (1) described above and coupling the illuminated sighting system (1) to the firearm (2). The method can further include aiming the firearm (2) at a target (3). The method can further include positioning the firearm (2) such that the first viewable aiming indicium (4) is visible to the shooter, meaning within the shooter's line of sight (18) which extends from their aiming eye (5) along a straight path to the target (3). Following, the firearm (2) and the target (3) can be aligned. The method can further include firing a projectile from the firearm (2) at the target (3). The method can further include hitting the target (3) with the projectile. The method can further include uncoupling the illuminated sighting system (1) and the firearm (2).

As can be easily understood from the foregoing, the basic concepts of the present invention may be embodied in a variety of ways. The invention involves numerous and varied embodiments of an illuminated sighting system which can be incorporated into a wide variety of sights for weapons.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "sight" should be understood to encompass disclosure of the act of "sighting"—whether explicitly discussed or not—and, conversely, were there effectively disclosure of the act of "sighting," such a disclosure should be understood to encompass disclosure of "sighting" and even a "means for sighting." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

Moreover, for the purposes of the present invention, the term "a" or "an" entity refers to one or more of that entity; for example, "a light source" refers to one or more of those light sources. As such, the terms "a" or "an", "one or more" and "at least one" can be used interchangeably herein.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Thus, the applicant(s) should be understood to claim at least: i) each of the illuminated sighting systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. An illuminated sighting system for a firearm, comprising:
   a first light conductive member having a first light conductive member first end which provides a first light conductive member viewing end;
   said first light conductive member configured to (i) receive light from one or more light sources, and (ii) transmit at least a portion of said light internally toward said first light conductive member viewing end for emission as a first amount of emitted light which provides a first viewable aiming indicium that indicates alignment of said firearm with a target;
   a second light conductive member having a second light conductive member first end which provides a second light conductive member viewing end;
   said second light conductive member configured to (i) receive light from one or more light sources, and (ii) transmit at least a portion of said light internally toward said second light conductive member viewing end for emission as a second amount of emitted light which provides a second viewable aiming indicium that indicates misalignment of said firearm with said target;
   wherein said second light conductive member viewing end disposes about said first light conductive member viewing end; and
   a lens operably coupled to said first and second light conductive member viewing ends;
   wherein said lens disposes in axially spaced-apart relation to said first and second light conductive member viewing ends.

2. The illuminated sighting system of claim 1, wherein only one or the other of said first and second viewable aiming indicia is visible to an aiming eye of a shooter of said firearm at any one time.

3. The illuminated sighting system of claim 1, wherein said second light conductive member viewing end comprises an annular area.

4. The illuminated sighting system of claim 3, said second light conductive member viewing end having a constant radial portion between second light conductive member viewing end inner and outer surfaces about said first light conductive member viewing end.

5. The illuminated sighting system of claim 4, wherein said radial portion has a radial portion length which is not less than the diameter of said first light conductive member viewing end.

6. The illuminated sighting system of claim 1, wherein said first and second viewable aiming indicia are visible in an illumination field.

7. The illuminated sighting system of claim 6, wherein only one or the other of said first and second viewable aiming indicia is visible in said illumination field at any one time.

8. The illuminated sighting system of claim 6, wherein said first and second viewable aiming indicia comprise different colors of light.

9. The illuminated sighting system of claim 1, wherein said one or more light sources from which said first light conductive member and/or said second light conductive member receives light comprise ambient light.

10. The illuminated sighting system of claim 1, wherein said one or more light sources from which said first light conductive member and/or said second light conductive member receives light comprise a light emitting element.

11. The illuminated sighting system of claim 10, wherein said light emitting element is selected from the group consisting of: light emitting diodes, luminescent paints, chemiluminescent elements, electroluminescent conductors, radioluminescent elements, and combinations thereof.

12. The illuminated sighting system of claim 10, further comprising only one said light emitting element which provides light to said first and second light conductive members.

13. The illuminated sighting system of claim 10, wherein said light emitting element comprises a first light emitting element which provides light to said first light conductive member, and a second light emitting element which provides light to said second light conductive member.

14. The illuminated sighting system of claim 1, wherein said lens is configured and positioned relative to said first light conductive member viewing end to provide a field of view having the same perimeter as the perimeter of said first light conductive member viewing end.

15. The illuminated sighting system of claim 1, wherein when a sight axis which passes axially through the center of said lens and the center of said first light conductive member viewing end is aligned with a shooter's line of sight, said lens is configured and positioned relative to said first light conductive member viewing end to provide a field of view having a boundary which aligns with the perimeter of said first conductive member viewing end.

16. The illuminated sighting system of claim 1, wherein said lens magnifies said first light conductive member viewing end by at least 2×.

17. The illuminated sighting system of claim 1, wherein the distance between said lens and said first light conductive member viewing end is at least 10× the diameter of said first light conductive member viewing end.

18. The illuminated sighting system of claim 1, further comprising a housing configured to house said first and second light conductive members, and said lens;
wherein said housing comprises a housing length which permits said firearm with said illuminated sighting system fixed thereto to be disposed within a holster without mechanically interfering therewith.

19. The illuminated sighting system of claim 1, wherein said illuminated sighting system provides a rear sight for said firearm.

20. The illuminated sighting system of claim 1, wherein the focal point of said lens disposes between said lens and said first and second light conductive member viewing ends.

21. The illuminated sighting system of claim 1, wherein the distance between said lens and said first and second light conductive member viewing ends is greater than the focal length of said lens.

22. An illuminated sighting system for a firearm, comprising:
a first light conductive member having a first light conductive member first end which provides a first light conductive member viewing end;
said first light conductive member configured to (i) receive light from one or more light sources, and (ii) transmit at least a portion of said light internally toward said first light conductive member viewing end for emission as a first amount of emitted light which provides a first viewable aiming indicium that indicates alignment of said firearm with a target;
a second light conductive member having a second light conductive member first end which provides a second light conductive member viewing end;
said second light conductive member configured to (i) receive light from one or more light sources, and (ii) transmit at least a portion of said light internally toward said second light conductive member viewing end for emission as a second amount of emitted light which provides a second viewable aiming indicium that indicates misalignment of said firearm with said target;
wherein said second light conductive member viewing end disposes about said first light conductive member viewing end; and
a lens operably coupled to said first and second light conductive member viewing ends;
wherein said lens comprises a plane surface which faces toward and is axially spaced-apart from said first and second light conductive member viewing ends.

23. An illuminated sighting system for a firearm, comprising:
a first light conductive member having a first light conductive member first end which provides a first light conductive member viewing end;
said first light conductive member configured to (i) receive light from one or more light sources, and (ii) transmit at least a portion of said light internally toward said first light conductive member viewing end for emission as a first amount of emitted light which provides a first viewable aiming indicium that indicates alignment of said firearm with a target;
a second light conductive member having a second light conductive member first end which provides a second light conductive member viewing end;
said second light conductive member configured to (i) receive light from one or more light sources, and (ii) transmit at least a portion of said light internally toward said second light conductive member viewing end for emission as a second amount of emitted light which provides a second viewable aiming indicium that indicates misalignment of said firearm with said target;
wherein said second light conductive member viewing end disposes about said first light conductive member viewing end;
wherein said first and second light conductive member viewing ends are coplanar; and
a lens operably coupled to said first and second light conductive member viewing ends; wherein said lens disposes in axially spaced-apart relation to said first and second light conductive member viewing ends.

24. An illuminated sighting system for a firearm, comprising:
a first light conductive member having a first light conductive member first end which provides a first light conductive member viewing end;
said first light conductive member configured to (i) receive light from one or more light sources, and (ii) transmit at least a portion of said light internally toward said first light conductive member viewing end for emission as a first amount of emitted light which provides a first viewable aiming indicium that indicates alignment of said firearm with a target;
a second light conductive member having a second light conductive member first end which provides a second light conductive member viewing end;
said second light conductive member configured to (i) receive light from one or more light sources, and (ii) transmit at least a portion of said light internally toward said second light conductive member viewing end for emission as a second amount of emitted light which provides a second viewable aiming indicium that indicates misalignment of said firearm with said target;
wherein said second light conductive member viewing end disposes about said first light conductive member viewing end; and
a lens operably coupled to said first and second light conductive member viewing ends;
wherein said one or more light sources from which said first light conductive member and/or said second light conductive member receives light comprises a light emitting element; and
wherein said light emitting element disposes along an axial length of the first light conductive member and an axial length of the second light conductive member.

25. An illuminated sighting system for a firearm, comprising:
a first light conductive member having a first light conductive member first end which provides a first light conductive member viewing end;
said first light conductive member configured to (i) receive light from one or more light sources, and (ii) transmit at least a portion of said light internally toward said first light conductive member viewing end for emission as a first amount of emitted light which provides a first viewable aiming indicium that indicates alignment of said firearm with a target;

wherein a first light conductive member length includes a coiled portion;

a second light conductive member having a second light conductive member first end which provides a second light conductive member viewing end;

said second light conductive member configured to (i) receive light from one or more light sources, and (ii) transmit at least a portion of said light internally toward said second light conductive member viewing end for emission as a second amount of emitted light which provides a second viewable aiming indicium that indicates misalignment of said firearm with said target;

wherein said second light conductive member viewing end disposes about said first light conductive member viewing end; and a lens operably coupled to said first and second light conductive member viewing ends.

* * * * *